United States Patent [19]
Minowa et al.

[11] Patent Number: 6,095,117
[45] Date of Patent: Aug. 1, 2000

[54] METHOD AND AN APPARATUS FOR CONTROLLING A CAR EQUIPPED WITH AN AUTOMATIC TRANSMISSION HAVING A LOCKUP CLUTCH

[75] Inventors: Toshimichi Minowa, Ibaraki-ken; Yutaka Nishimura; Ken'ichi Kawashima, both of Katsuta; Hiroshi Kuroiwa, Hitachi; Masahiko Ibamoto, Katsuta, all of Japan

[73] Assignee: Hitachi, Ltd., Tokyo, Japan

[21] Appl. No.: 09/236,483

[22] Filed: Jan. 25, 1999

Related U.S. Application Data

[60] Continuation of application No. 08/917,949, Aug. 17, 1997, Pat. No. 5,888,166, which is a division of application No. 08/700,854, Aug. 21, 1995, Pat. No. 5,724,866, which is a continuation of application No. 08/521,411, Aug. 30, 1995, Pat. No. 5,580,334, which is a division of application No. 08/025,211, Mar. 2, 1993, Pat. No. 5,468,196.

[30] Foreign Application Priority Data

Mar. 2, 1992 [JP] Japan ..................... 4-044376

[51] Int. Cl.[7] .................................................. F02D 41/00
[52] U.S. Cl. ................................. 123/399; 123/361
[58] Field of Search ...................... 123/399, 361, 123/352

[56] References Cited

U.S. PATENT DOCUMENTS

| | | | |
|---|---|---|---|
| 2,645,183 | 7/1953 | Parsons | 417/410.4 |
| 3,434,282 | 3/1969 | Shelhart | 417/410.4 |

(List continued on next page.)

FOREIGN PATENT DOCUMENTS

| | | |
|---|---|---|
| 041328 | 12/1981 | European Pat. Off. . |
| 0430675A2 | 6/1991 | European Pat. Off. . |
| 56-35858 | 4/1981 | Japan ........................ 477/169 |
| 8185269 | 8/1981 | Japan . |
| 61-136057 | 6/1986 | Japan . |
| 61-229622 | 10/1986 | Japan ........................ 477/174 |
| 6416446 | 1/1989 | Japan ........................ 477/110 |
| 1-46062 | 2/1989 | Japan ........................ 477/168 |
| 2092245A | 8/1982 | United Kingdom ........ 477/168 |
| 2 189 296 | 10/1987 | United Kingdom . |
| 2189296A | 10/1987 | United Kingdom ........ 477/169 |

*Primary Examiner*—Henry C. Yuen
*Assistant Examiner*—Mahmoud M. Gimie
*Attorney, Agent, or Firm*—Evenson, McKeown, Edwards & Lenahan, P.L.L.C.

[57] ABSTRACT

The present invention relates to a method and an apparatus for controlling a car equipped with an automatic transmission having a lockup clutch. According to the control method of the present invention, when the lockup clutch is in the lockup state, a variation of a generated torque is detected. When the range of the torque variation detected exceeds a predetermined value, an engine torque is reduced by controlling the engine, and the automatic transmission is controlled to compensate for a reduction of the driving torque due to a reduction of the engine torque. Thus, the speed change ratio is changed to the low gear side. The control unit of the present invention includes a unit for controlling an output torque of an engine according to a command value, a unit for changing the transmission ratio of the automatic transmission, a unit for detecting a variation of the engine torque, a unit for deciding a target driving torque, a unit for reducing a torque command value when the range of a detected variation of the torque has exceeded a predetermined value when the lockup clutch was in the lockup state, and a unit for deciding a transmission ratio at which the reduction of the driving torque due to the reduction of the engine torque is compensated for.

5 Claims, 37 Drawing Sheets

U.S. PATENT DOCUMENTS

| | | | |
|---|---|---|---|
| 3,733,817 | 5/1973 | MacDuff | 60/405 |
| 3,954,147 | 5/1976 | Hollins | 60/405 X |
| 3,958,657 | 5/1976 | McBurnett | 60/405 X |
| 4,152,894 | 5/1979 | Rumyantseo et al. | 192/3.3 X |
| 4,410,057 | 10/1983 | Johnson | 60/405 X |
| 4,458,558 | 7/1984 | Frank | 74/665 GE |
| 4,484,497 | 11/1984 | Hibino | 477/169 |
| 4,548,100 | 10/1985 | Höhn | 74/665 GE X |
| 4,580,465 | 4/1986 | Omitsu | 477/107 |
| 4,706,522 | 11/1987 | Nitz | 477/61 |
| 4,716,999 | 1/1988 | Tezuka et al. | 192/3.29 |
| 4,736,652 | 4/1988 | Shimamoto | 74/665 GE |
| 4,811,713 | 3/1989 | Shimada et al. | 123/399 |
| 4,856,369 | 8/1989 | Stockton | 74/665 GE |
| 4,901,597 | 2/1990 | Hattori et al. | 74/665 GE |
| 4,984,545 | 1/1991 | Kaneyasu et al. | 123/399 |
| 5,044,469 | 9/1991 | Liu | 417/410.4 |
| 5,078,109 | 1/1992 | Yoshida et al. | 123/350 |
| 5,088,352 | 2/1992 | Ishimaru | 74/665 GE X |
| 5,150,635 | 9/1992 | Minowa et al. | 477/107 |
| 5,191,953 | 3/1993 | Ito et al. | 477/107 |
| 5,282,450 | 2/1994 | Uchida et al. | 123/399 |
| 5,337,237 | 8/1994 | Katayama et al. | 364/426.04 |
| 5,385,517 | 1/1995 | Hara et al. | 477/169 |
| 5,513,732 | 5/1996 | Goates | 192/3.3 |

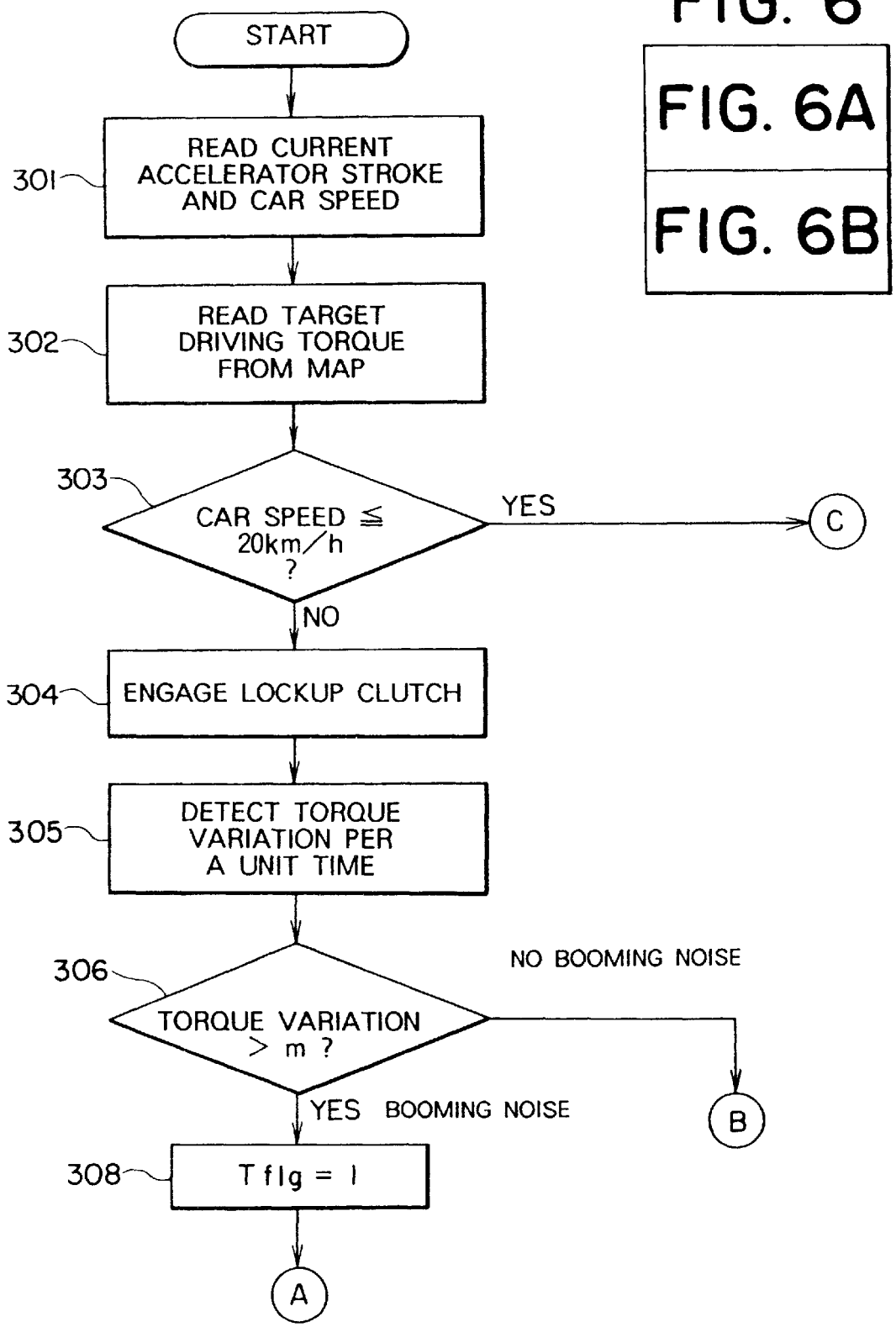

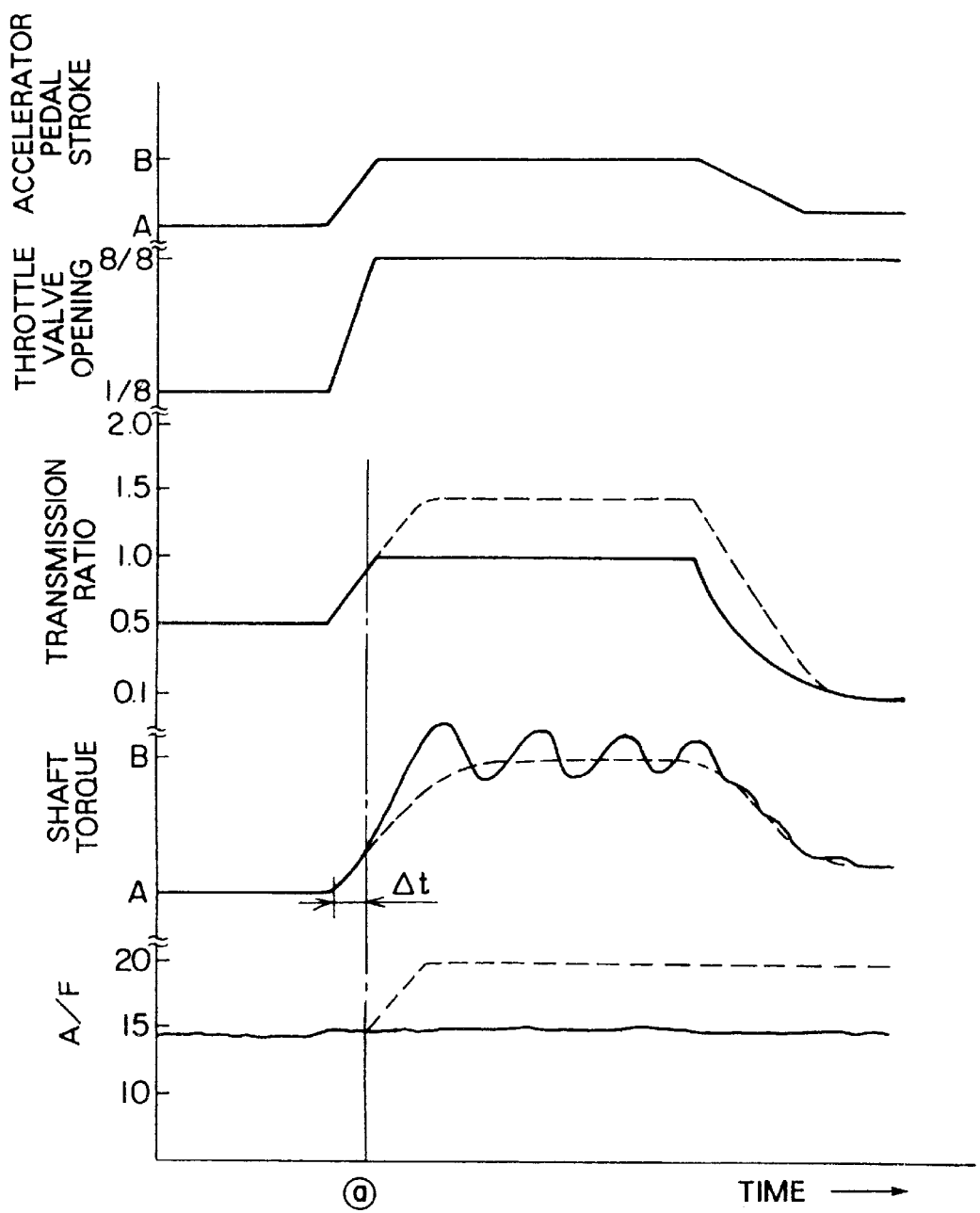

Nt : OUTPUT SHAFT SPEED
Ne : INPUT SHAFT SPEED

METHOD AND AN APPARATUS FOR CONTROLLING A CAR EQUIPPED WITH AN AUTOMATIC TRANSMISSION HAVING A LOCKUP CLUTCH

This application is a continuation of application Ser. No. 08/917,949, filed Aug. 27, 1997, now U.S. Pat. No. 5,888, 166, which is a divisional of application Ser. No. 08/700, 854, filed Aug. 21, 1996, (U.S. Pat. No. 5,724,866); which is a continuation of prior application Ser. No. 08/521,411 (U.S. Pat. No. 5,580,334), filed Aug. 30, 1995, which is a divisional application of prior application Ser. No. 08/025, 211 (U.S. Pat. No. 5,468,196) filed Mar. 2, 1993.

BACKGROUND OF THE INVENTION

In a car equipped with an automatic transmission having a lockup clutch, the present invention relates to a method and an apparatus for controlling the car which controls both the engine and the automatic transmission to improve the fuel economy of the car and provide of comfortable riding of the car.

An automatic transmission equipped with a torque converter has a slipping loss due to the torque converter and has, therefore, a disadvantage of higher fuel consumption as compared with a manual transmission equipped with a mechanical clutch. As a result, there has been an increasing tendency that an automatic transmission having a lockup clutch built into the torque converter is being used to have an improved fuel economy of the car.

A lockup clutch mechanically transmits an engine torque directly to the transmission with a clutch except for starting or slow speed running of a car, to thereby avoid a slipping loss of a fluid in the torque converter. Accordingly, when the lockup clutch is being engaged (locked up), a torque is transmitted from the engine to the car shaft without the fluid so that fuel economy of the car can be improved.

From the viewpoint of improving the fuel economy, it is more advantageous that the car speed, when the lockup clutch is engaged, is set as low as possible. However, if a car is abruptly accelerated from the state of a low engine speed in a lockup state, there occurs an extreme torque variation, which makes it difficult for the fluid to absorb the torque variation, and a vibration occurs in the drive train as a result. This vibration is transmitted to the car body to generate a car body vibration and a booming noise within the passenger room. Accordingly, although a lockup at the time of a slow speed operation is desirable from the viewpoint of the fuel economy, the car speed when the lockup operation is started is limited from the viewpoint of the restriction of a car body vibration (torque variation).

A lockup control of the torque converter is disclosed in the Japanese Patent Unexamined Publication No. JP-A-61-136057 dated Jun. 23, 1986 for example. According to the invention disclosed in this publication, a lockup is cancelled when a torque variation has occurred.

According to the conventional automatic transmission, there has been a wide operation area in which the torque converter is used in a slipping state, or a lockup cancelled state, which has resulted in a small effect of improvement in the fuel economy due to the lockup clutch.

SUMMARY OF THE INVENTION

It is an object of the present invention to improve the fuel economy of the car equipped with an automatic transmission having a lockup clutch and to improve the drivability of the car.

It is appropriate to define terms which are used in the specification of the present invention, before entering the description of the invention. In the present specification, "an output torque of the engine (an engine torque) refers to "a torque obtained by the output shaft of the engine" and "a driving torque" refers to "a torque obtained by the output shaft of the transmission".

In the present invention, both the engine and the automatic transmission are controlled. The engine is controlled so that a variation of the engine torque is restricted under the operating condition in which the fuel consumption is the minimum. At the same time, the automatic transmission is controlled so that the transmission rate is controlled to obtain a requested driving torque or the lockup is cancelled to avoid an engine stall.

According to the present invention, it is possible to set the lockup operation starting point at a low speed side and at the same time it is possible to restrict a car body vibration in the lockup at the slow speed operation and to restrict a booming noise.

According to control unit for a car of the present invention, when a driver has started operation of an accelerator pedal, a target driving torque of the car which corresponds to the level of depression stroke of the accelerator pedal is determined. Based on the target driving torque, the transmission rate of the transmission and the target output torque of the engine are determined. Based on the target engine torque, the throttle valve opening of the engine is decided. The automatic transmission and the engine are controlled with the actuator so that the decided transmission rate and throttle value opening can be obtained.

According to one embodiment of the present invention, a variation of the engine torque or a variation of the shaft torque is detected during the above-described torque control when the lockup clutch is in the lockup state. When the variation of the engine torque (shaft torque) exceeds the reference value, the engine operation is controlled in the direction to lower the current engine torque and thus restricts the vibration of the car body. Further, at the same time. when the engine torque is controlled, the transmission rate of the automatic transmission is changed to a lower geared position, to compensate for a reduction of the engine torque, and thus maintains the driving torque of the car.

According to another embodiment of the present invention, in a car mounted with an engine in the air-fuel ratio controlling, engagement or disengagement of the lockup clutch is selectively decided according to the condition of the air-fuel ratio in operation. The car has a memory for storing a map which shows the operation area of the air-fuel ratio which can be locked up. The map shows an iso-air/fuel ratio chart with the engine torque and the engine speed as the parameters. When the values of the engine speed and the engine torque are given, the air-fuel ratio can be determined from the map. The lockup clutch is controlled according to the decision of whether the air-fuel ratio is under the lockup condition or not.

According to still another embodiment of the present invention, the actual air-fuel ratio is directly detected by the sensor. This embodiment is provided with a memory which stores areas of the air-fuel ratios for the cases that the lockup clutch is engaged and disengaged. A decision is given as to which condition within the memory the measured air-fuel ratio matches. The lockup clutch is controlled based on the result of the decision of whether the air-fuel ratio falls under the lockup condition or not.

According to still another embodiment of the present invention, a memory which stores a map that shows an engine operation area in which the lockup clutch is engaged. Such engine operation area is indicated by the engine torque and the car speed as parameters. The engine torque and the car speed are detected, and the lockup clutch is controlled according to the decision of whether the engine is operated under the area of the lockup condition in the map.

BRIEF DESCRIPTION OF THE DRAWINGS

FIG. 7 is a timechart for showing the change of the signal of each part when the control of FIG. 6 is actually carried out;

DESCRIPTION OF THE PREFERRED EMBODIMENTS

Figure 1:
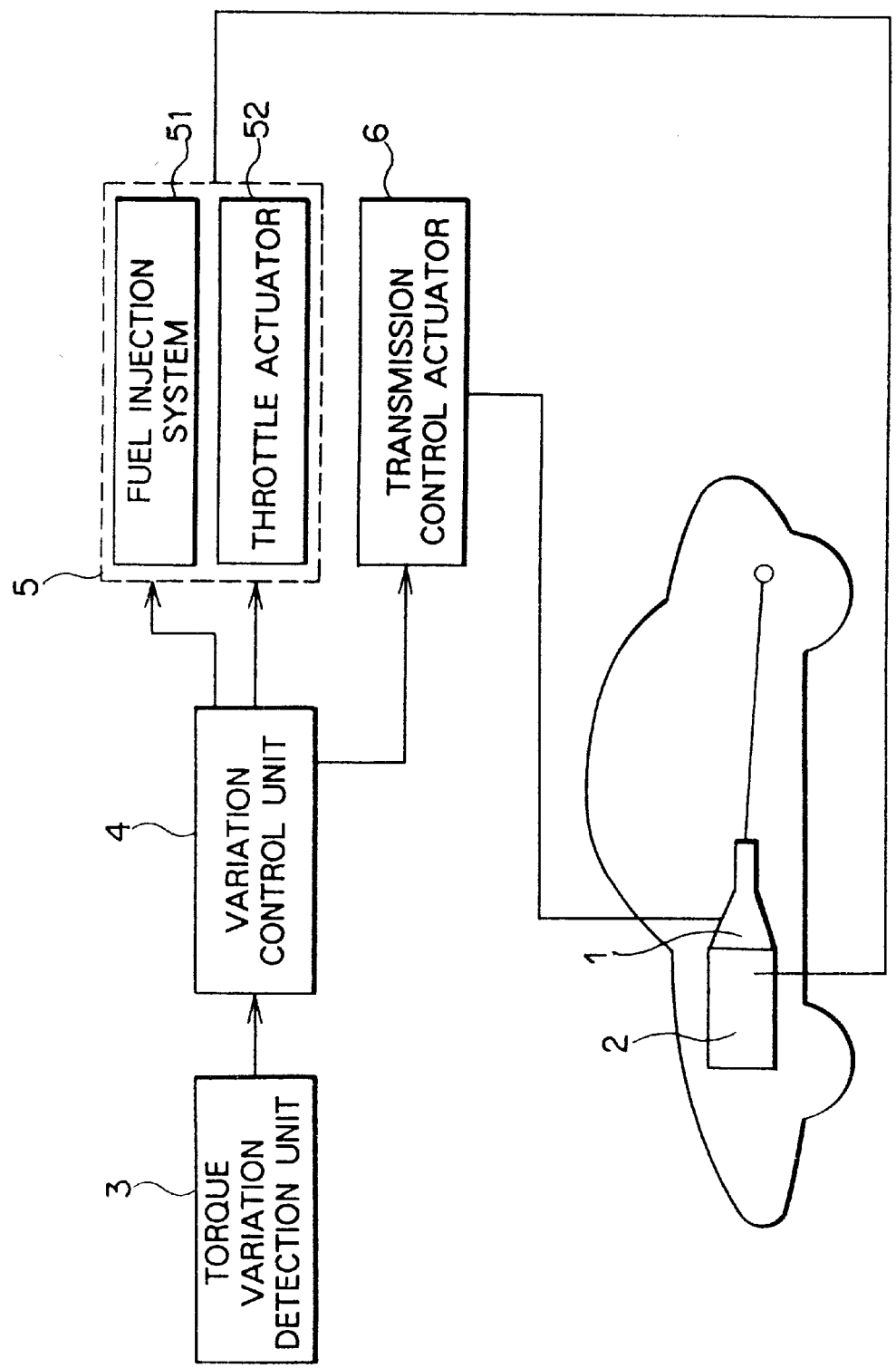
FIG. 1 is a block diagram for showing the basic concept of the control of a car according to the present invention.

FIG. 1 is a block diagram for showing the basic configuration of the torque control system of the car equipped with an automatic transmission having a lockup clutch according to the present invention. When an automatic transmission 1 is in the lockup state, a variation of the output torque of engine 2 is detected by a torque variation detecting unit 3. When the variation of the engine torque (or a shaft torque) has exceeded a reference value as a result of an acceleration operation made by the driver when the driver depressed the accelerator pedal further more while the engine 2 was operating at a relatively low speed, the torque variation detecting unit 3 produces an output signal. The reference value is set in advance on the basis of the level at which a value of a torque variation causes a booming noise in the car.

A torque variation controlling unit 4 produces a signal for instructing a reduction of the engine torque to a unit 5 which controls the engine torque in response to the occurrence of the output signal of the torque variation detecting unit 3. At the same time, the torque variation controlling unit 4 produces in a transmission rate control actuator 6 a signal for changing the transmission rate of the automatic transmission 1 to compensate for a reduction of the driving torque due to a reduction of the engine torque, and applies this signal to the automatic transmission 1. The automatic transmission 1 changes the speed change rate to the lower geared position.

The torque variation detecting unit 3 of the engine 2 includes a torque sensor. In addition to the torque sensor, other units for detecting a torque variation calculate a torque based on the output of a car acceleration sensor, differentiate the car speed and detect a speed change of a ring gear. A unit 5 for controlling the engine torque includes a fuel injector 51 for controlling the fuel supply quantity and a throttle actuator 52 for controlling the intake air flow. Further, the unit 5 for controlling the engine torque may also include an ignition timing control unit, a valve timing control unit and a variable displacement unit or an EGR control unit. The automatic transmission 1 may include a non-stage transmission (CVT) which can continuously vary the speed change rate or a transmission which has a few or more stages of fixed gear ratios.

When the load of the driving system can not absorb all the engine torque at the moment when the driver has suddenly released the accelerator pedal to reduce the engine speed while the engine 2 was operating at a relatively low speed in the lockup state of the automatic transmission 1, there is a risk of an engine. stall. Particularly in the case of a lean burn engine, the engine generates relatively low output torque in the lean burn operation area, and thus there is a high possibility of an occurrence of an engine stall. In this case, the torque variation controlling unit 4 produces a signal for instructing an increase of the engine torque to the unit 5 for controlling the engine torque. At the same time, the torque variation controlling unit 4 applies to the speed change rate control actuator 6 a signal for changing the transmission ratio of the automatic transmission 1 to restrict the increase of the driving torque due to an increase of the engine torque, or produces a signal for disengaging the lockup clutch and applies this signal to the automatic transmission 1.

By the control system shown in FIG. 1, even if the car speed, at which the lockup clutch is engaged, has been set to the low speed side, it is possible to simultaneously control the engine torque and the transmission ratio, to prevent both a booming noise when the automatic transmission is locked up and an engine stall. Thus, the fuel economy of the car can be improved.

Figure 2:
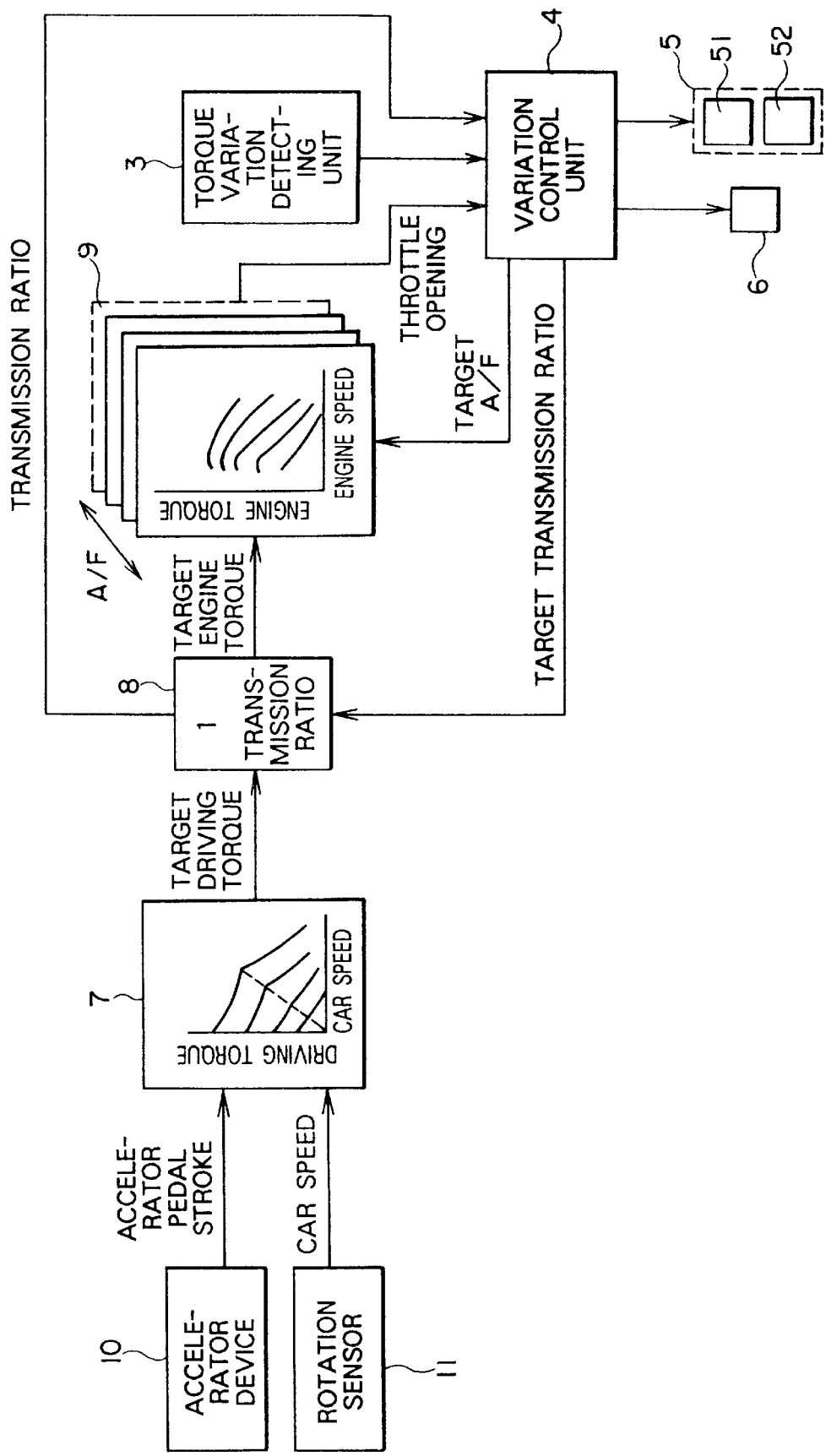
FIG. 2 is a block diagram for showing the torque-transmission rate control system according to the present invention.

FIG. 2 shows a block diagram of an embodiment for achieving the system shown in FIG. 1. In a car according to the present embodiment, a target driving torque is calculated based on a depression stroke on the accelerator pedal, and the output torque of the engine and the transmission ratio of the automatic transmission are controlled so that the target driving torque value can be produced from the output shaft.

A target driving torque operating unit 7 has a map which shows the relationship between the car speed and the driving torque for each depression stroke of the accelerator pedal. The driving torque map is stored in the memory after this has been measured experimentally in advance. The driving torque map will be explained in detail later with reference to FIG. 4. The depression stroke of the accelerator pedal and the car speed are detected by an accelerator device 10 and a car speed sensor 11 respectively, and they are inputted to the target driving torque operating unit 7. The accelerator 10 produces an electric signal according to the depression stroke of the accelerator pedal, by a combined use of the accelerator pedal and a potentiometer. The car speed sensor 11 is a conventional speed sensor.

The target driving torque operating unit 7 retrieves a driving torque map and obtains a target driving torque determined by an input value. An operating unit 8 determines the target driving torque and the target engine torque based on the target transmission ratio. Assuming there is no transmission loss (transmission efficiency=100%), a relationship of $T_o = T_e \times i$ exists, where $T_o$ is a driving torque, $T_e$ is an engine output torque and "i" is a transmission ratio. At first, the value of the target engine torque $T_e$ is selected to have an optimum fuel economy, and the transmission ratio i is decided based on the target engine torque $T_e$ and the target driving torque $T_o$. Alternately, the value of the target engine torque $T_e$ can be selected so that the air-fuel ratio of the mixture becomes the target value and then the transmission ratio i is decided based on the target engine torque $T_e$ and the target driving torque $T_o$. The former case is a torque control attaching great importance to fuel economy and the latter case is a torque control attaching great importance to the exhaust emission control.

When the target engine torque has been decided, a throttle value opening deciding unit 9 refers to the map of the relationship between the engine speed and the engine torque at the target air-fuel ratio, to decide a target throttle value opening which produces a given target engine torque and which brings about the best efficiency of the engine operation. The torque variation control unit 4 produces a throttle valve control signal to be gained by the target throttle value opening and applies the throttle value control signal to the throttle actuator 52 of the engine torque control unit 5. The throttle actuator 52 is an actuator for driving the throttle value according to the control signal. The torque variation control unit 4 produces a command for changing the transmission ratio or a command for changing the target air-fuel ratio, in response to the detection of a torque variation by the torque variation detecting unit 3. The command of the transmission ratio is given to the transmission ratio control actuator 6.

Figure 3:
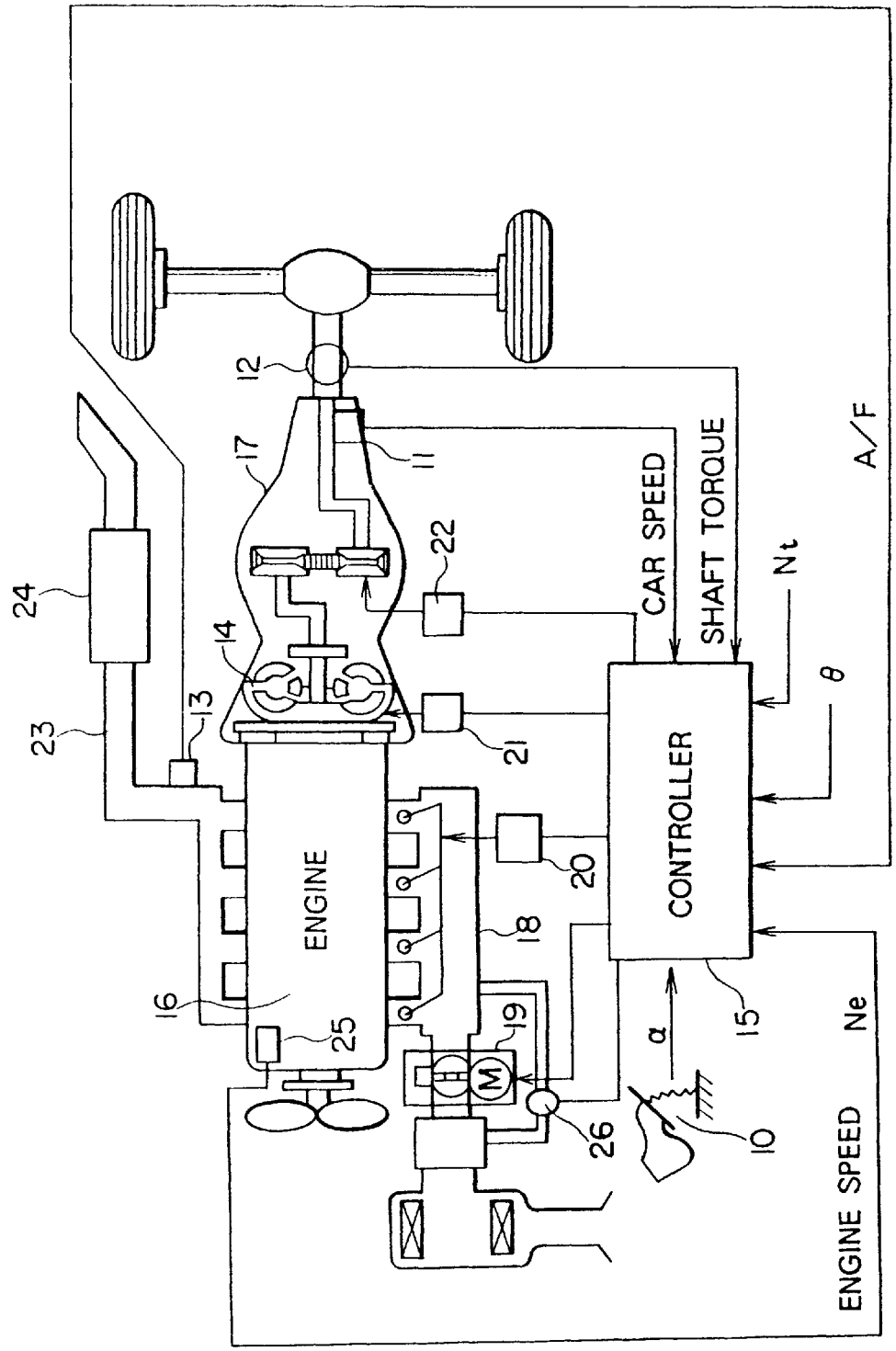
FIG. 3 is a block diagram for showing an embodiment of the torque-transmission rate control system according to the present invention.

FIG. 3 is a block diagram of the power train system for a car in which the control unit shown in FIG. 2 is applied. The torque variation detecting unit 3 (excluding the torque sensor), the torque variation control unit 4, the target driving torque operating unit 7, the operating unit 8 and the throttle valve opening deciding unit 9 of FIG. 2 are stored within a controller 15. Each functional block within the controller 15 may be realized by an individual electric circuit, and all or part of the functional blocks may be realized by a conventional computer which is operated by a program. A depression stroke of the accelerator pedal 10, a car speed signal from the car speed sensor 11, a torque signal from a shaft torque sensor 12, an air-fuel ratio signal from an air-fuel ratio sensor 13, an output shaft speed Nt and an input shaft speed Ne of a torque converter 14 and a throttle opening θ are inputted to the controller 15. The controller 15 controls an engine 16 and a transmission 17 by using the control system shown in FIG. 2. The engine control is carried out-by a combination of throttle actuators (a motor, a throttle valve and a throttle sensor) provided on an air intake pipe of the engine 16 and a fuel injection valve 20. The transmission control is carried out by a lockup control actuator 21 for carrying out a lockup control and a speed change control actuator 22. A Nox reduction catalyst 24 is disposed in exhaust pipe 23 for emission controlling in controlling of the air-fuel ratio. The present invention can also be applied to car equipped with an exhaust emission control system which uses an oxyde catalytic converter or a three-way catalytic converter. When the control actuator of the governor lever of the fuel injection pump is used instead of the throttle actuator 19, this system can also be applied to the control of a diesel engine car.

Figure 4:
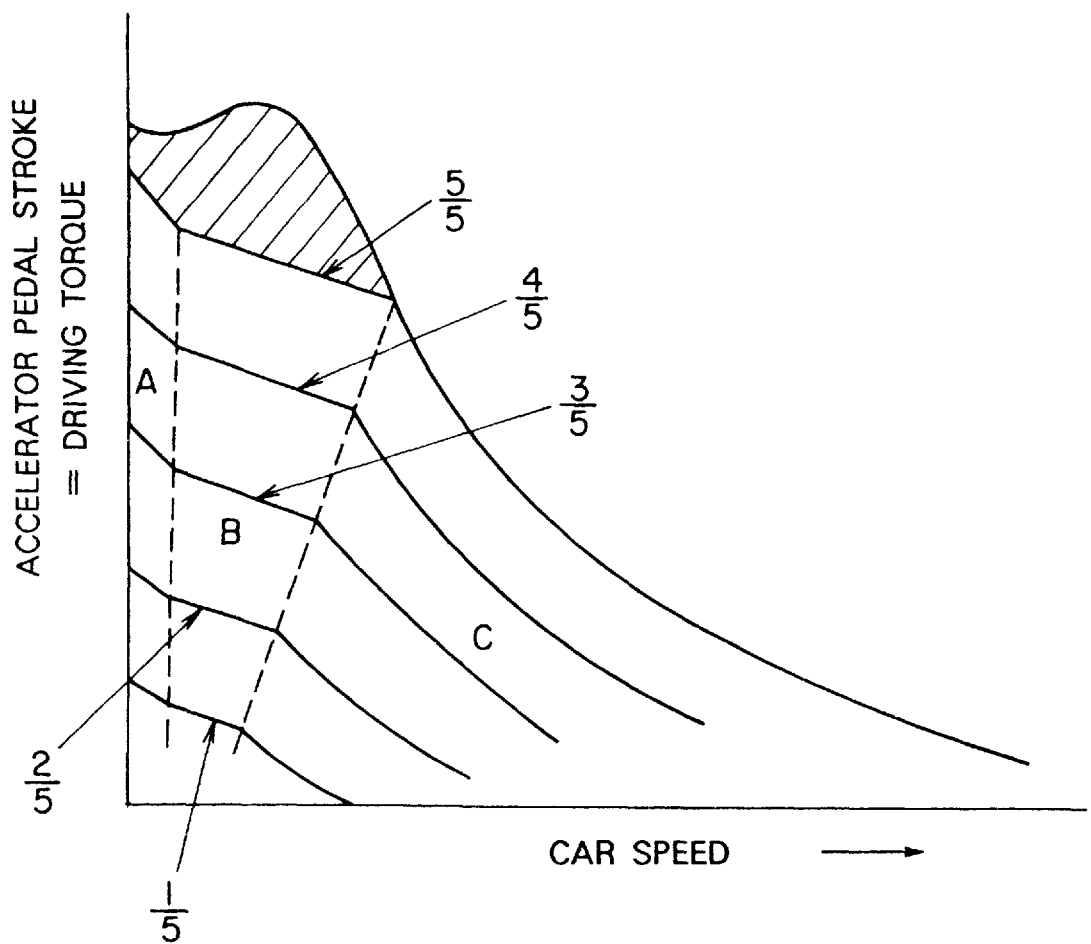
FIG. 4 is a map for showing the relationship between the car speed and the driving torque.

FIG. 4 is a map for showing an optimum relationship between the car speed and the driving torque stored in the target driving torque operating unit 7 shown in FIG. 2. In FIG. 4, the horizontal axis shows the car speed and the vertical axis shows the driving torque corresponding to the accelerator pedal angle. The hatched area in the map shown an excess driving torque portion, and it is necessary to escape from this area to reduce the weight of the driving system and to secure an optimum drivability. A range A separated by a broken line is a take-off marginal torque area for setting a large driving torque to have an improved startability of the car, prepared by considering the car inertia at the time of starting. A range B separated by two broken lines is an acceleration torque area which changes depending on the accelerator pedal stroke (such as 5/5: maximum stroke, 4/5 partial stroke, etc.) as shown. This area is a driving torque necessary for giving an acceleration to the engine after the car has started until the car speed reaches the target car speed smoothly. A range C is a car speed constant torque portion for outputting a driving torque which matches the running resistance to enable the driver to achieve a constant run speed as he desires. An ideal driving pattern by an expert driver is predetermined and set in the map shown in FIG. 4.

Figure 5:
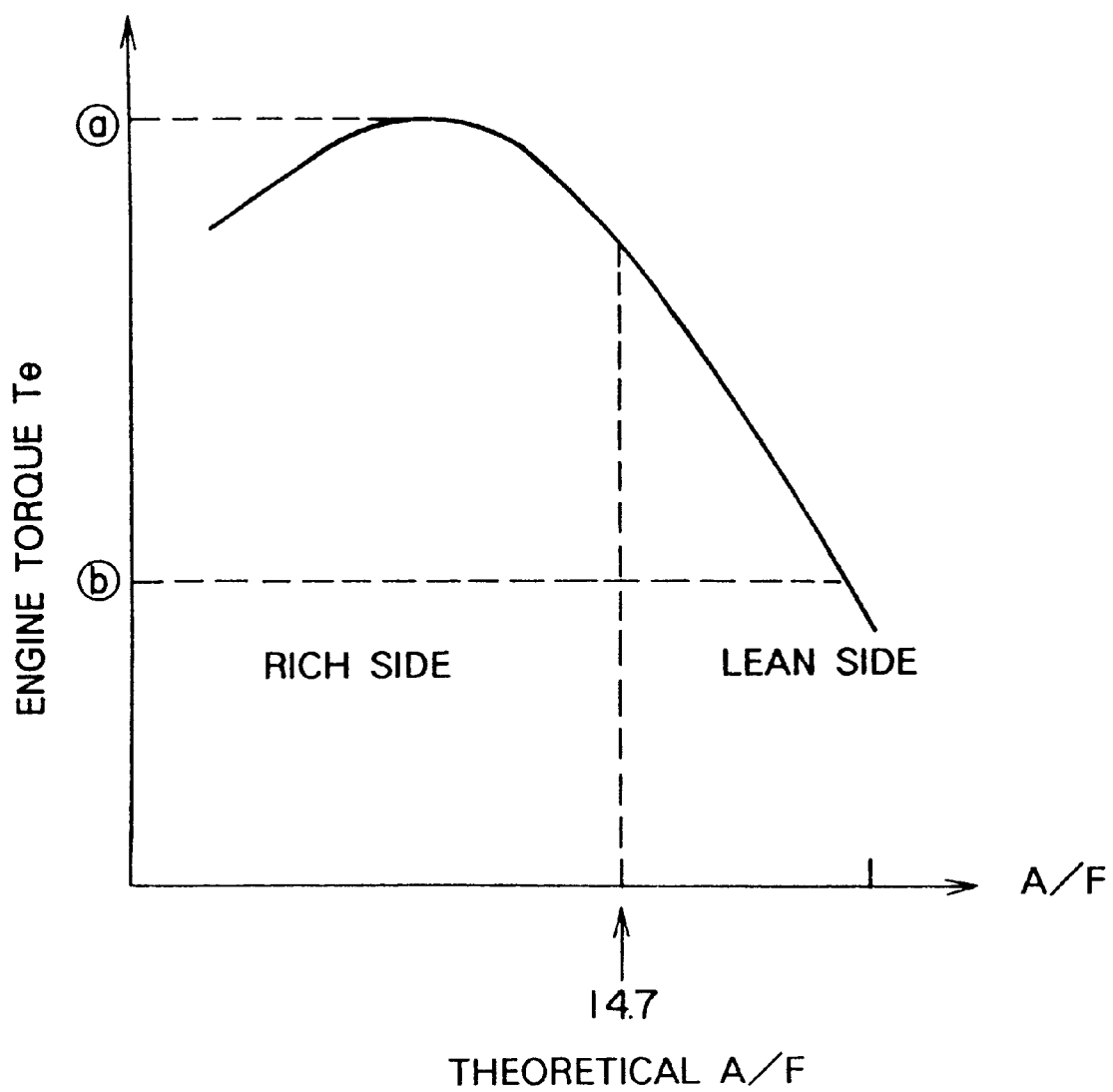
FIG. 5 is a map for showing the relationship between the air-fuel ratio and the engine torque.

The throttle opening deciding unit 9 shown in FIG. 2 stores the map of the relationship between the engine speed and the engine torque for each value of the air-fuel ratio. FIG. 5 shows a result of the map of the relationship between the engine speed and the engine torque converted into a map of the relationship between the air-fuel ratio and the engine torque under the condition of a constant speed. It is understood from FIG. 5 that the engine torque changes depending on the air-fuel ratio. For example, if the air-fuel ratio is changed to a lean side when the car is being driven at the air-fuel ratio of 14.5, the engine torque reduces to about ½ of the torque at the air-fuel ratio 14.5. When a changed engine torque value has been decided, a value of the air-fuel ratio to be controlled can be decided from the map of the relationship between the engine speed and the engine torque for each air-fuel ratio. The control of the engine torque can be executed with a relatively high precision by this air-fuel ratio control.

Figure 6B:
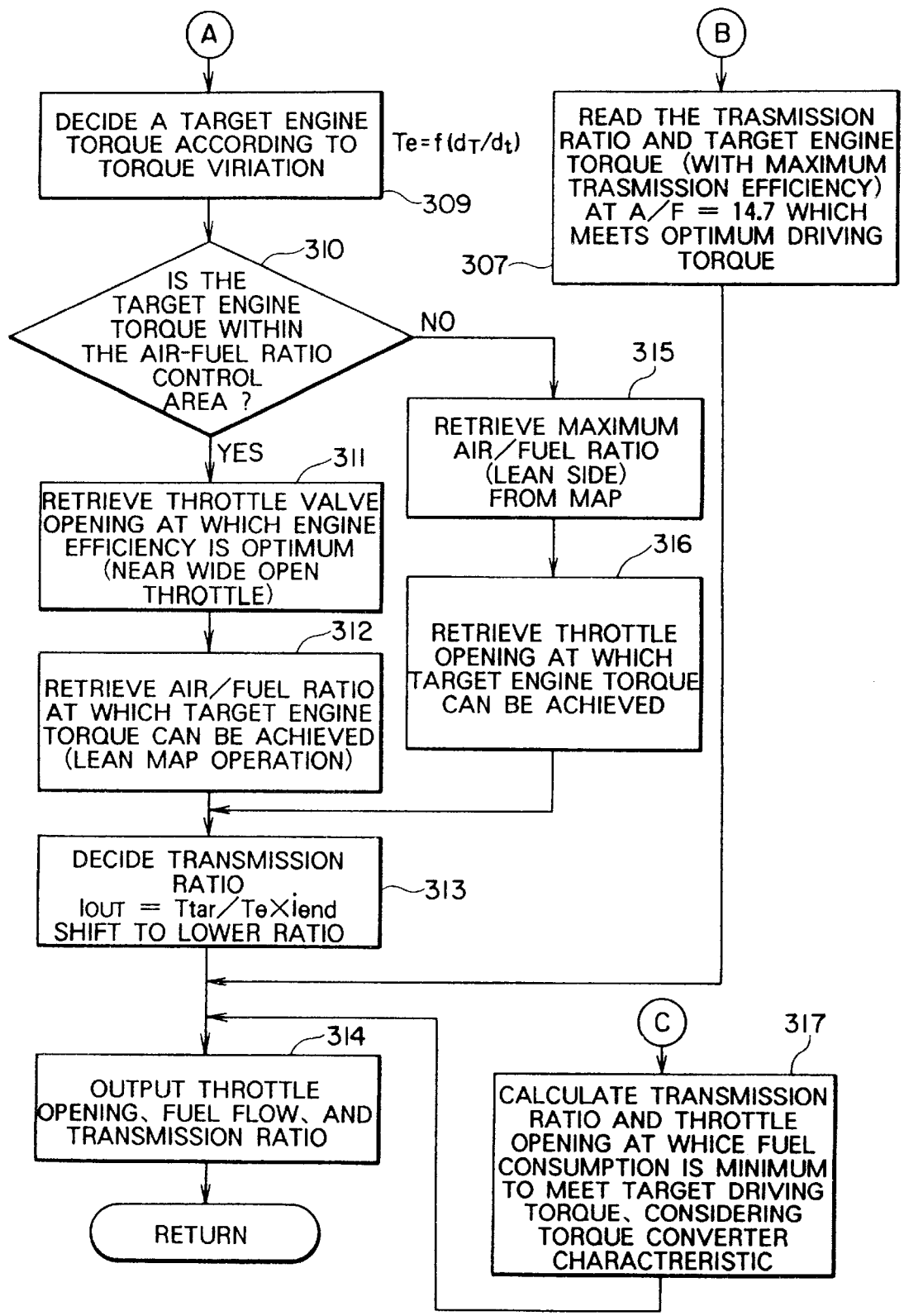
FIG. 6 is a flowchart consisting of FIGS. 6A and 6B for showing the method for controlling the relationship between the torque and the transmission rate.

Next, the control method according to the present invention in a car using the CVT (Continuously Variable Transmission) shown in FIG. 3 will be explained with reference to FIG. 6. The control flow shown in FIG. 6 is executed-by a control program which is stored in the microcomputer within the controller 15.

At Step 301, the current depression stroke of the acceleration pedal and the current car speed are read from the accelerator 10 and the car speed sensor 11. At Step 302, the target driving torque operating unit 7 refers to the map which shows the relationship between the car speed and the driving torque and obtains a target driving torque which is determined by the accelerator pedal angle and the car speed value. At Step 303, a decision is given whether the current car speed is not higher than 20 km/h or not. The value of this reference car speed is the car speed when the engaging of the lockup clutch is started. This value is one example, and the present invention does not limit the reference value to 20 km/h. When the car speed is the reference car speed of 20 km/h or lower, the lockup clutch is disengaged and the automatic transmission 17 transmits the torque by the fluid (through the torque converter). When power is to be transmitted through the torque converter, at Step 317, the transmission ratio at which the target driving torque is to be generated and the throttle opening and the air-fuel ratio at which the fuel consumption rate is minimum are decided, by considering the operation characteristics of the torque converter.

When the current car speed is not equal to or lower than 20 km/h, at Step 304, the lockup actuator 21 operates so that the lockup clutch connects the engine output shaft directly with the input shaft of the CVT.

The torque variation detecting unit 3 is monitoring the shaft torque from the shaft torque sensor 12, and calculates the change quantity of the shaft torque per unit time or the torque variation quantity, at Step 305. At Step 306, a decision is made whether the torque variation quantity is larger than the reference value m or not. The reference value m is decided in advance by considering the torque variation quantity corresponding to the level of a booming noise generated.

Figure 38:
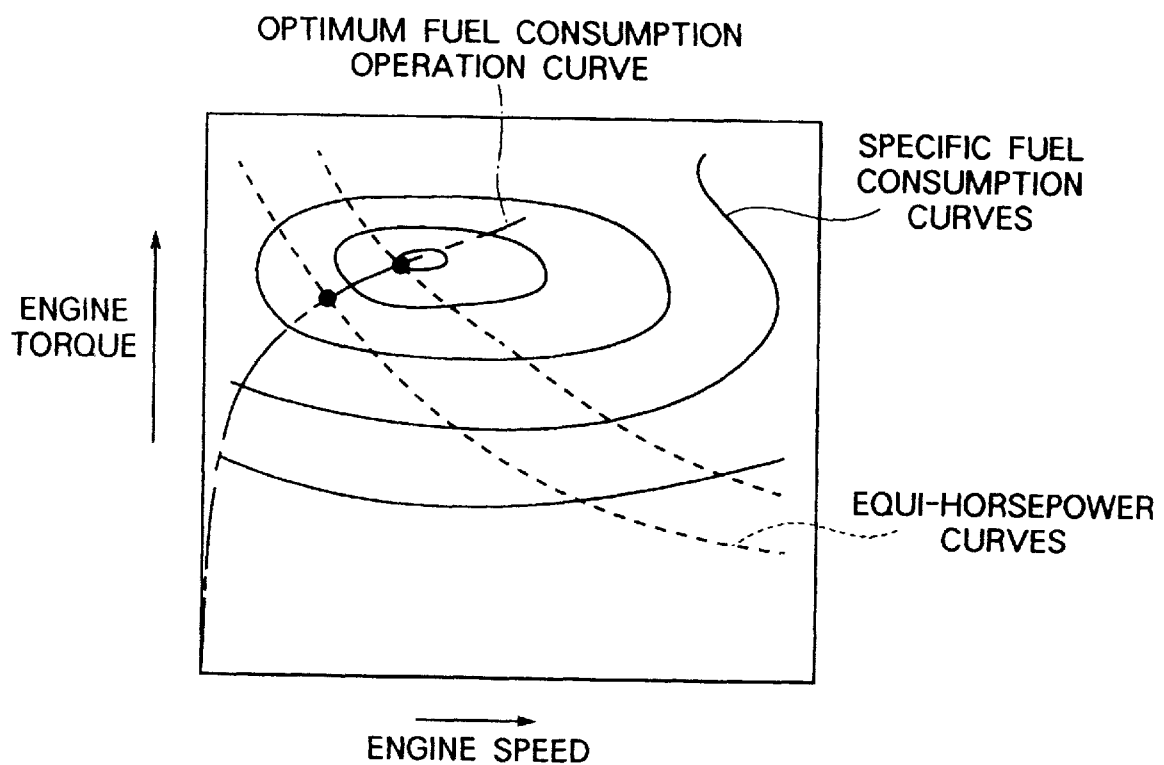
FIG. 38 shows an engine efficiency diagram.

When the torque variation quantity is equal to or smaller than the reference value m, a decision is made that no booming noise has occurred. At Step 307, the following normal control is carried out. The operating unit 8 decides the target engine torque based on the target driving torque and the target speed change rate. When the target engine torque has been decided, the throttle valve opening deciding unit 9 refers to the map of the relationship between the engine speed and the engine torque at the target air-fuel ratio, produces a given target engine torque and decides the target throttle valve opening and the speed change rate which provide an optimum efficiency of the engine operation. A maximum efficiency curve is shown in the map which shows the relationship between the engine speed and the engine torque. Such map is shown in FIG. 38.

The torque variation controlling unit 4 produces a throttle valve control signal for the target throttle valve-opening to obtain and applies the throttle valve control signal to the throttle valve control actuator 19. The command of the transmission ratio is applied to the transmission ratio control actuator 22.

When the torque variation quantity has exceeded the reference value m, "1" is set to the flag within the control flag 15 at Step 308. When the flag shows "1", this means that the torque variation has exceeded the reference value m. When the torque variation value has exceeded the reference value m, the engine torque must be lowered to prevent a booming noise. At Step 309, a target engine torque (an absolute value) according to a torque variation quantity is decided. The relationship between the torque variation quantity and the target engine torque is experimentally decided in advance and is stored in the memory (not shown) within the controller 15. This is an almost inverse proportional relationship.

At Step 310, a decision is made whether the target engine torque is within the air-fuel ratio control area or not. A map of an equi-air-fuel ratio having the engine torque and the engine speed as parameters is referred to and a decision is made about the air-fuel ratio area based on the target engine torque and the output of the engine rotation sensor 25. When the air-fuel ratio area is known, a decision is made about whether this area is within the air-fuel ratio control area or not. The equi-air-fuel ratio map is stored in the memory in advance. An air-fuel ratio control area is indicated in the equi-air-fuel ratio map in advance.

At Step 311, a throttle opening on the maximum efficiency curve is obtained which produces a given target engine torque by referring to the map of the relationship between the engine speed and the engine torque within the throttle value opening deciding unit 9, and this throttle opening is set as a target throttle opening. At Step 312, a map of the relation between the engine speed and the engine torque for each air-fuel ratio is referred to and a target air-fuel ratio is decided.

At Step 313, a target speed change rate is decided based on the ratio of the target driving torque to the target engine torque. At Step 314, the throttle actuator 19 is operated to control the fuel injection valve 20 according to the target air-fuel ratio, and the transmission ratio actuator 22 is operated according to the target transmission ratio.

When a decision has been made at Step 310 that the target engine torque is not the air-fuel ratio control area, at Step 315, a map closest to the lean side (with a large value of the air-fuel ratio) is read from the map of the relationship between the engine speed and the engine torque for each air-fuel ratio within the throttle valve opening deciding unit 9. Next at Step 316, a throttle valve opening on the maximum efficiency curve is obtained which produces a given target engine torque by referring to the map. Then, Step 313 and subsequent steps follows.

FIG. 7 shows the operation data of FIG. 6. When the accelerator pedal angle has changed from A to B, the throttle opening opens from the state of 1/8 of the part throttle to the full opening 8/8, and the transmission ratio moves to the lower side so that the change of the accelerator pedal angle and the change of the driving torque become proportional to each other. However, when the transmission has been locked up, the shaft torque rises suddenly to cause a vibration in the low-engine speed area. To avoid this problem, when a sudden rise of the shaft torque has been detected, the air-fuel ratio of the engine is set to be large (lean mixture) to lower the engine torque, and at the same time, the speed change rate is set lower, to improve the fuel economy and drivability of the car, while maintaining the driving torque.

Figure 8:
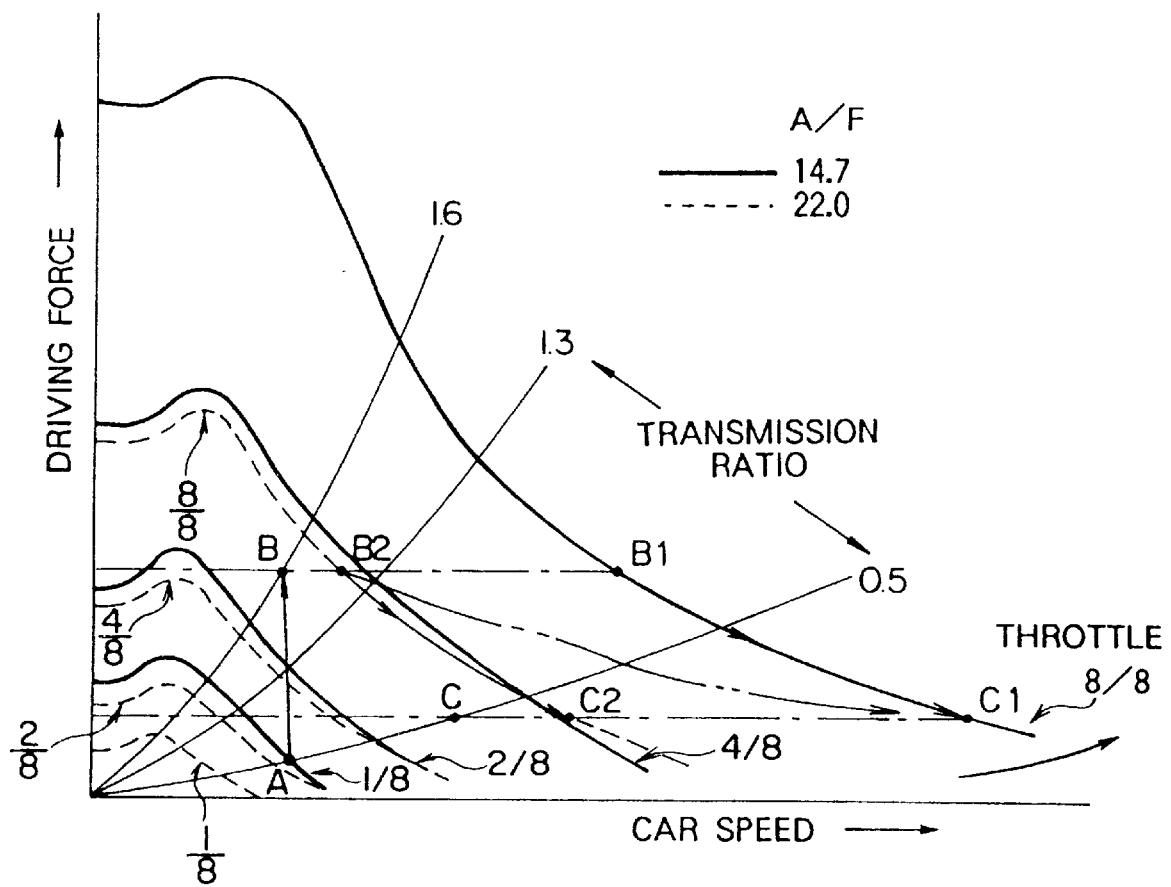
FIG. 8 is a driving force line diagram for showing the case where the engine and the transmitter are. combined.

FIG. 8 is the control flow of FIG. 6 expressed in a driving force line diagram. Solid lines show driving forces by accelerator pedal angles at the air-fuel ratio of 14.7. Broken lines show driving forces by accelerator pedal angles at the air-fuel ratio of 22.0. Numerals 0.5, 1.3 and 1.6 show representative speed change rates, and there exist unlimited number of speed change rates in the case of a stageless transmission such as the CVT. When the accelerator pedal angle is changed from A to B, the driving force of B is required. Since the driving force of B coincides with the driving force of $B_1$ and the driving force of $B_2$, the driving force of $B_1$ at which the throttle opening is the full open is selected. When a torque variation occurs, it is necessary to lower the engine torque, so that the driving force is shifted to the position of $B_2$ at which the air-fuel ratio is large, and thus the engine can maintain an optimum fuel consumption area. Thereafter, the driving force is shifted to the driving force $C_1$ or $C_2$ which matches the running resistance to maintain a desired car speed. The car speed under the conditions of $B_1$ and $B_2$ is at the position of B and the car speed under the conditions of $C_1$ and $C_2$ is at the position of C.

Figure 9:
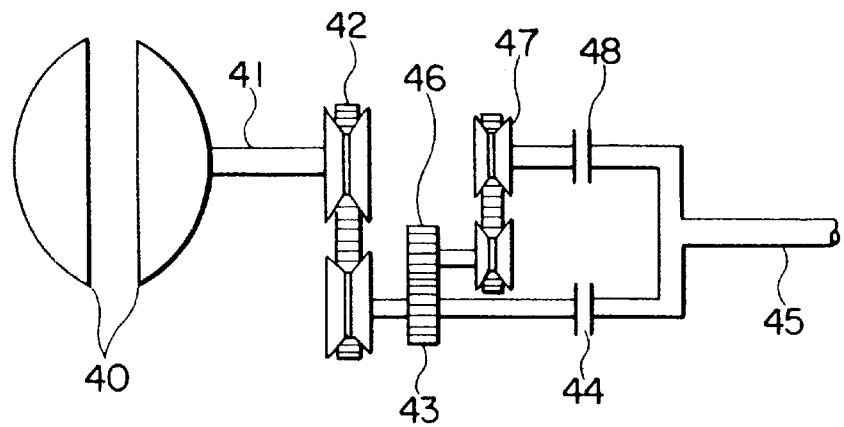
FIG. 9 is a configuration diagram of the transmission when two sets of CVT are connected.

FIG. 9 shows another embodiment of the transmission which can be loaded on the car to which the control unit and the control method of the present invention are applied. FIG. 9 shows two sets of CVT units connected together through a gear unit to expand a controllable range of the transmission ratio. An output shaft 41 of a fluid coupling 40 is coupled to a stageless continuous variable transmission 42 and is linked to an output shaft 45 through a gear 43 and a clutch 44. The gear 43 and a gear 46 are designed to rotate in a pair. The gear 46 is connected to another stageless transmission 47 of a belt system and is linked to the output shaft 45 through a clutch 48. A transmission ratio of the stageless transmission 42 can be obtained by engaging the clutch 44 and disengaging the clutch 48. By engaging the clutch 48 and disengaging the clutch 44, a transmission ratio of a combination of the stageless transmission 42 and the stageless transmission 47 can be obtained. When more stageless transmission of belt system are combined in this system, an automatic transmission with more combinations of transmission ratios can be realized.

Figure 10:
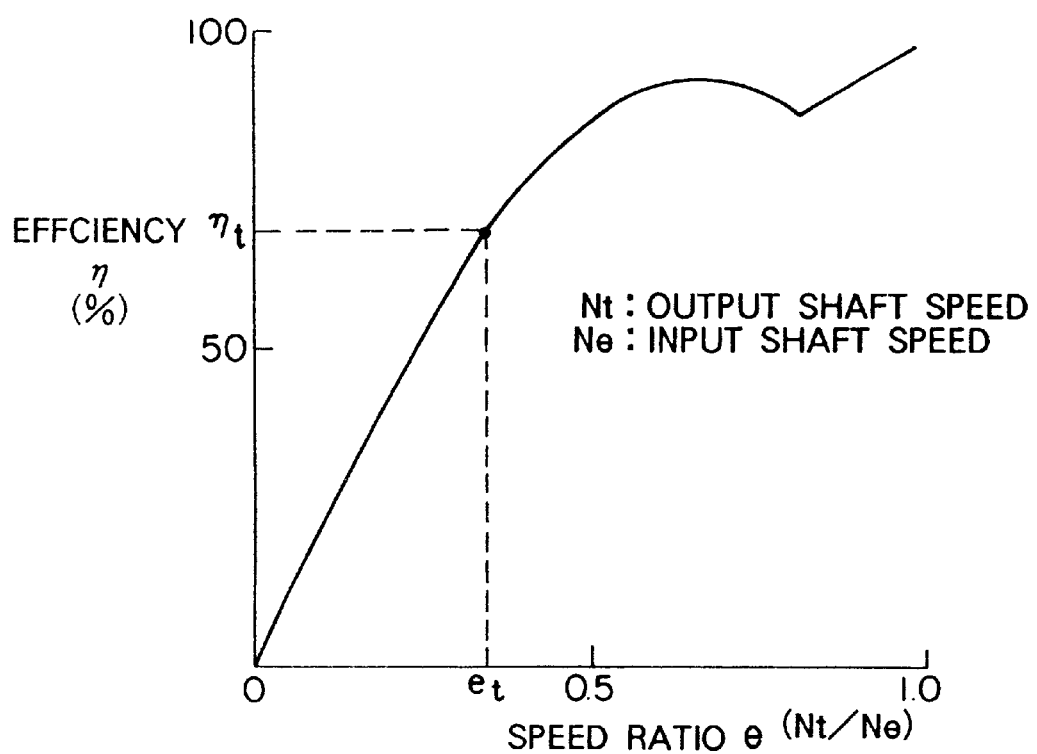
FIG. 10 is a curve diagram for showing the efficiency of the torque converter.

FIG. 10 shows efficiency characteristics of the torque converter. The horizontal axis shows a speed ratio which is a ratio of the output shaft speed Nt to the input shaft speed Ne of the torque converter, and the vertical axis shows an efficiency η. Efficiency changes according to the above speed ratio, and therefore, when the speed ratio is small, the efficiency is poor and the fuel economy is aggravated as a result. Accordingly, it is desirable to control the engine torque and the speed ratio to avoid the low efficiency area (below $η_t$)

Figure 11:
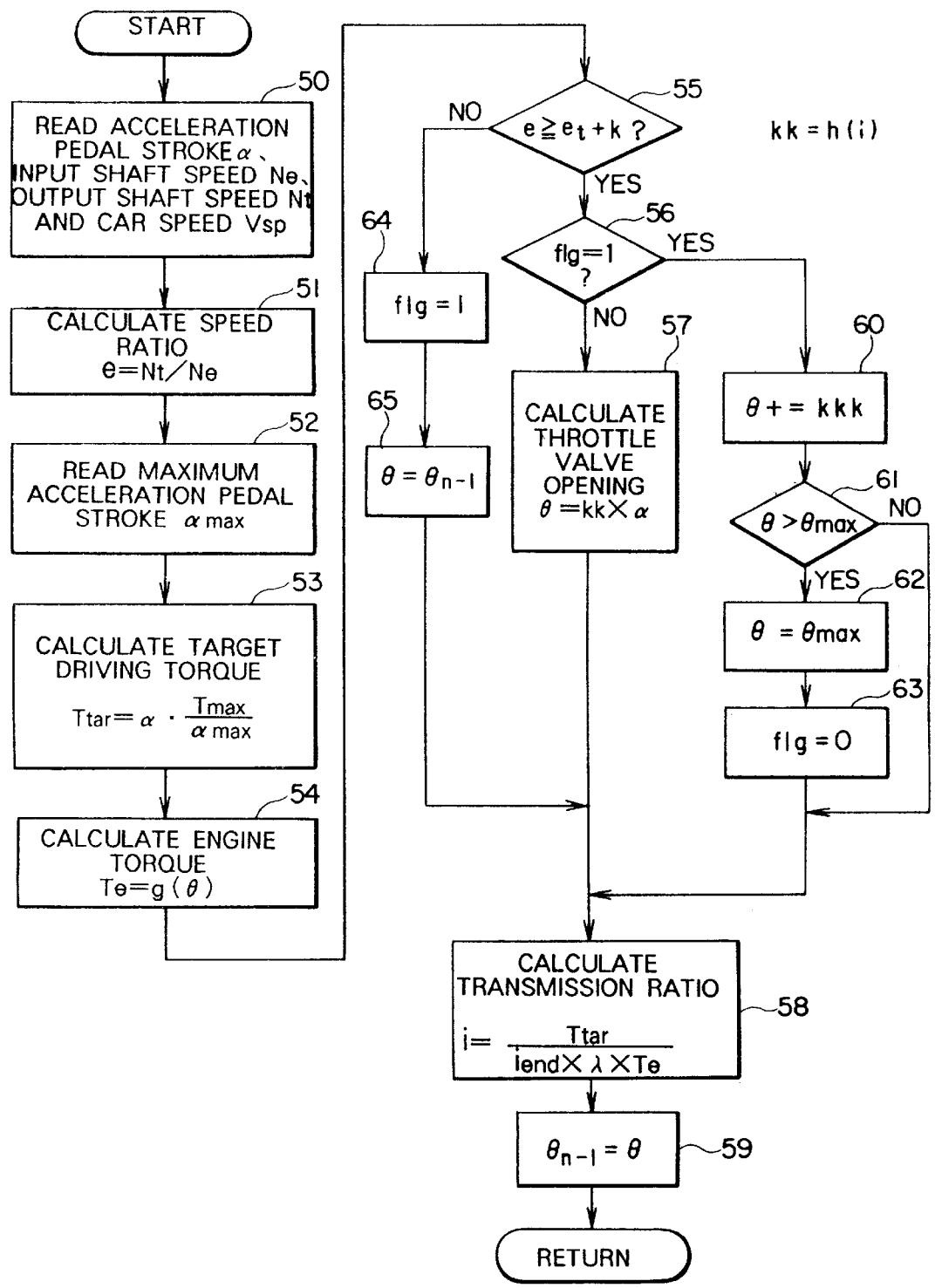
FIG. 11 is a flowchart for showing the control when the torque converter is to be operated at the maximum efficiency.

FIG. 11 is a control flow chart for operating the torque converter at a high efficiency condition. First, at Step 50, an accelerator pedal angle α, an input shaft speed Ne, an output shaft speed Nt and a car speed Vsp are read. Next, at Step 51, a speed ratio e is obtained based on the rate of the above output shaft speed Nt to the input shaft speed Ne (that is, Nt/Ne). Next, at Step 52, a maximum accelerator pedal angle $α_{max}$ is read. At Step 53, a target driving torque $T_{tar}$ is obtained from $α·T_{max}/α_{max}$. At Step 54, an engine torque $T_e$ is obtained from a function g(θ) of the throttle opening θ. Values obtained at the Steps 52 to 54 are used later when a speed ratio is calculated. At Step 55, a decision is made whether the speed ratio e is equal to et+k or above, where k is a constant and et is a marginal speed ratio. In other words, a margin of k is provided in addition to the marginal speed ratio so that the speed ratio does not exceed the marginal speed ratio due to the inertia of the rotation mass. If e is equal to or larger than et+k, at Step 56, a decision is made whether flg is 1 or not. If flg is not 1, at Step 57, a throttle valve opening e is obtained as a product of the accelerator pedal angle α and kk (which is a constant that takes a change h (i) at the speed change rate i), and the result is outputted. At Step 58, the speed change rate i is calculated. Last, at Step 59, the current throttle valve opening θ is inputted to $θ_{n-1}$. When flg is 1, at Step 60, kkk is added to the throttle valve opening θ for each task. Next, at Step 61, a decision is made whether the throttle valve opening θ for fail-safe has become the maximum throttle valve opening $θ_{max}$ or not. If the throttle valve opening θ has become the maximum throttle valve opening $θ_{max}$, the throttle valve opening θ is replaced by the maximum throttle valve opening $θ_{max}$ at Step 62. At Step 63, flg is set to zero, and Steps 58 and 59 follow. If e has become smaller than et+k, at Step 64, flg is set to 1. Further, at Step 65, the throttle valve opening θ is replaced by the previous throttle valve opening $θ_{n-1}$, to ensure that the throttle valve opening does not become larger and that the speed change rate does not fall under the low efficiency area. Then, Steps 58 and 59 are carried out. The flow of FIG. 11 is executed by a microcomputer of the controller 15 shown in FIG. 3 according to a control program. The efficiency operation control of the torque converter shown in FIG. 11 can be combined with the control of a booming noise shown in FIG. 6.

Figure 12:
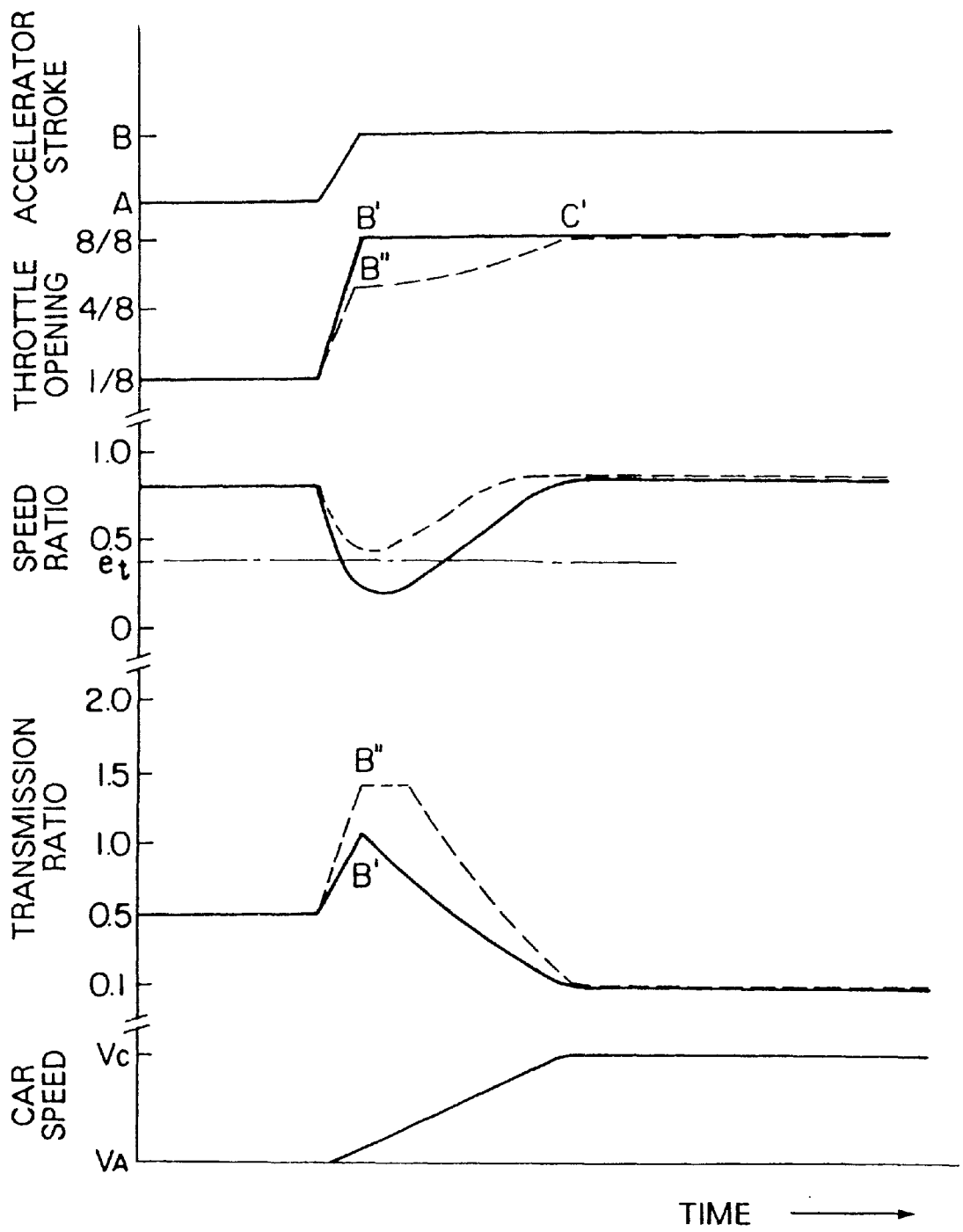
FIG. 12 is a timechart for showing the change of the signal of each portion when the control of FIG. 11 is actually carried out.

FIG. 12 shows operation data of the flow shown in FIG. 11. When the driver changes the depression stroke of the accelerator pedal from the level A to the level B to change the throttle opening to near the full opening, and at the same, to change the transmission ratio from 0.5 to about 1.2, the speed ratio is lowered to below the target speed ratio et. If the speed ratio is controlled by a feedback as shown in FIG. 11, the throttle valve opening and the transmission ratio as shown by broken lines are obtained and the fuel economy improves without going down below the target speed ratio et.

Figure 13:
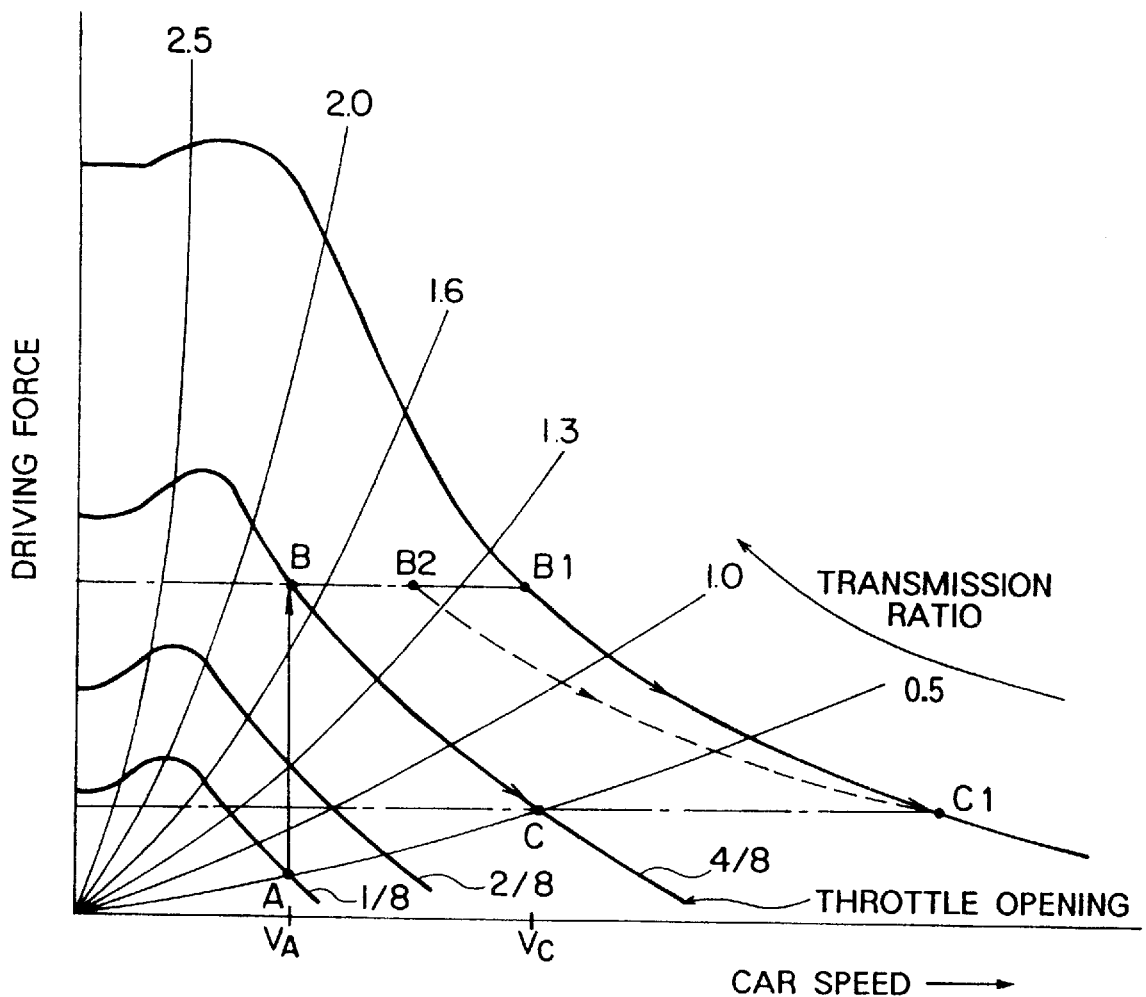
FIG. 13 is a diagram for showing the control of FIG. 12 in the driving force line diagram.

FIG. 13 shows the control operation of FIG. 12 in the line diagram of driving force. When the driver requests the driving torque of B, the driving torque of $B_1$ at the transmission ratio of 1.2 in the full opening the throttle valve (8/8) is most desirable from the viewpoint of the fuel economy. However, in this case, the torque converter slips when the car is running up along a sharp slope, and the fuel consumption becomes in a low efficiency area, resulting in a poor fuel economy. To avoid this situation, the throttle valve is closed to shift the transmission ratio to the lower side, to escape the low efficiency area. Then, the transmission ratio is gradually shifted to the higher side to move the driving torque of C to $C_1$ at which the fuel economy is better, and then the car speed is stabilized there.

Figure 14:
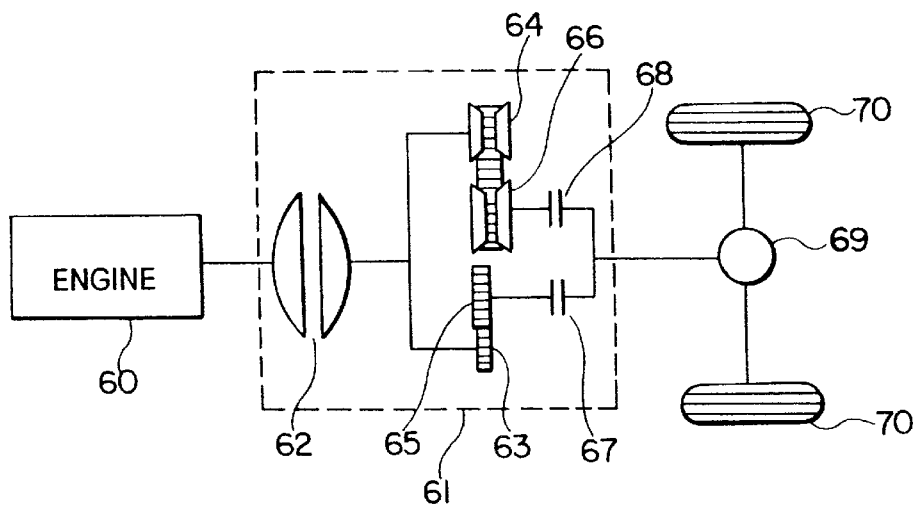
FIG. 14 shows the configuration of the hybrid transmission in which the gear of a fixed speed change rate and a CVT are combined.

FIG. 14 shows a configuration of the hybrid automatic transmission to which the present invention can be applied. An engine 60 is directly connected with a torque converter 62 of an automatic transmission 61 shown by a broken line. The torque converter 61 is directly connected with an input side gear 63 for a first speed level and an input side pulley 64 of a continuous variable transmission for a second speed level afterward. An output side gear 65 for the first speed level and an output side pulley 66 of the continuous variable transmission for the second speed level and afterward are directly connected with a differential gear 69 through a clutch 67 and a clutch 68 respectively, to transmit the torque generated by the engine 60 to wheels 70.

Figure 15:
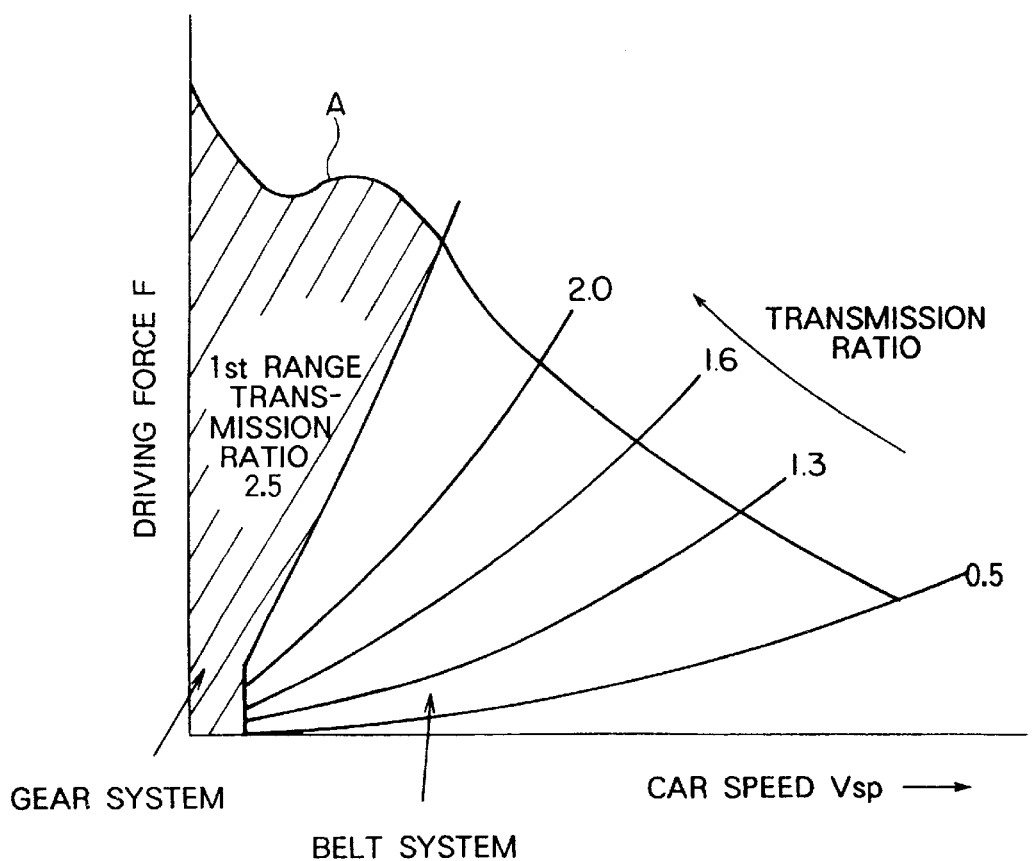
FIG. 15 is a line diagram for showing the driving force of the hybrid transmission shown in FIG. 14.

FIG. 15 shows a driving force diagram of the case where the hybrid automatic transmission of FIG. 14 is used. A solid line A shows a line of a maximum driving force when the throttle valve is full open. A shaded portion of the low car speed area is a first speed level area when the gear is used, and other areas are the second speed level and subsequent speed level areas where the continuous variable transmission is used. When the speed reduction ratio (for example 2.5) of the shaft of the first speed level is matched with the maximum speed reduction ratio of the continuous variable transmission of the second speed level and subsequent speed level area, a smooth car speed change can be realized without a shock of the speed change between the first speed and second speed levels.

Figure 16:
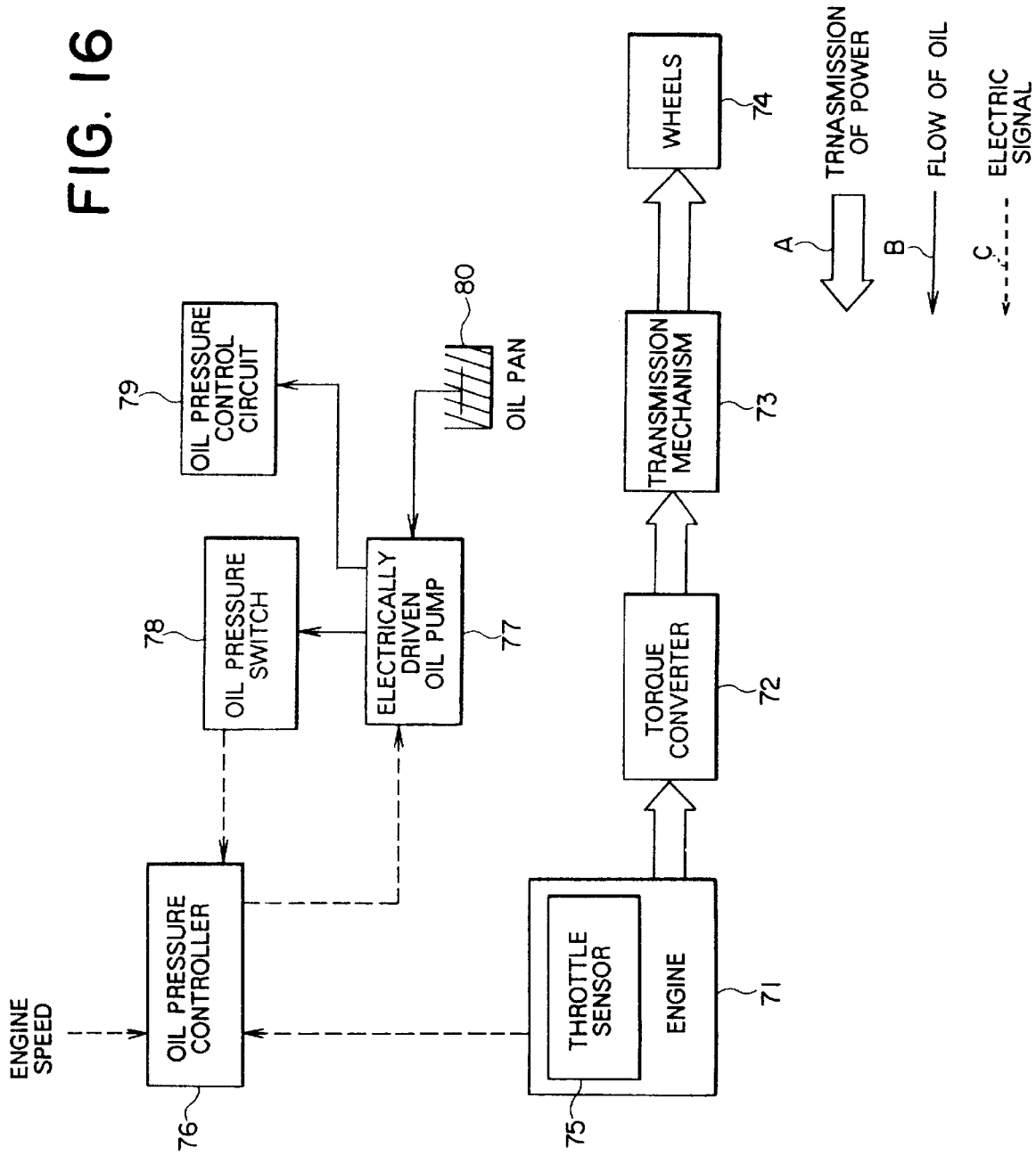
FIG. 16 is block diagram for showing the hydraulic pump control system which drives the torque converter having a lockup clutch and the transmission.

FIG. 16 shows a diagram of the oil pressure pump control system for controlling the torque converter having a lockup clutch and the transmission. In FIG. 16, an arrow A shows a transmission of power (torque), an arrow B shows a flow of oil and an arrow C shows an electric signal. A power generated from an engine 71 is transmitted to wheels 74 through a torque converter 72 and a speed changing mechanism 73. A signal of a throttle sensor 75 provided in the engine 71 and an engine speed signal are inputted to an oil pressure controller 76, to drive an electrically-driven oil pump 77. An oil pressure switch 78 is provided for feeding back the oil pressure to always realize an optimum-oil pressure to meet the operating condition. Oil is sent from the electrically-driven oil pump 77 to an oil pressure control circuit 79 to control the speed change and lockup. Oil is supplied from the oil pan 80. By the above arrangement, reduction of the oil pressure in the low speed area due to a locked-up driving can be prevented.

Figure 17:
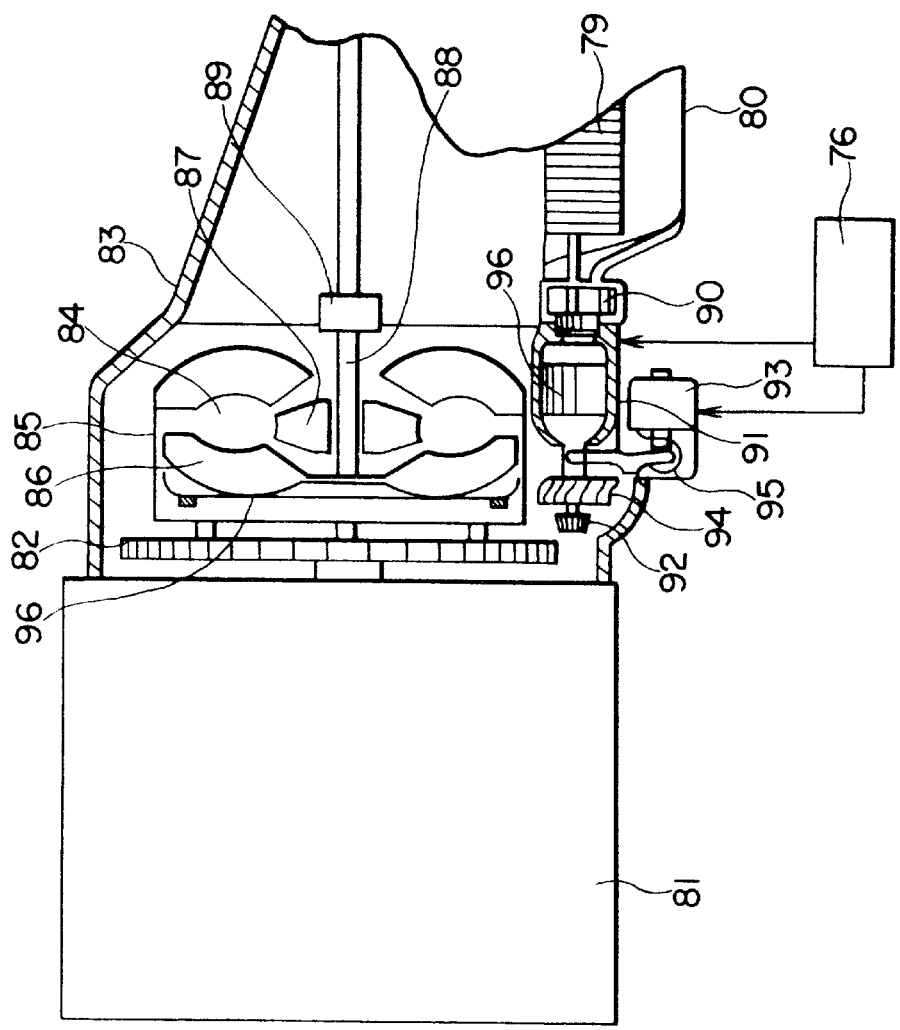
FIG. 17 is a system for driving the starter, the oil pump and the cooling fan with one motor.

FIG. 17 is a configuration diagram of a motor integrated with a starter, an oil pump and a cooling fan. A ring gear 82 directly connected to an engine 81 is directly connected to a pump 85 of a torque converter 84 provided in an automatic transmission 83. The torque from the pump 85 is transmitted to a turbine 86, and an impeller controllingly sends the oil which flows from the pump 85, to the turbine 86. The turbine 86 and an output shaft 88 are directly connected with each other. A mechanically-driven oil pump 89 is driven by the rotation of the output shaft 88. This is used as a fail-safe when an electrically-driven oil pump 90 is in fault. The structure of an integrated type motor 91 includes a gear 92 for starting the car, a magnet switch 93, a cooling fan 94, a lever 95 for starting the car and a rotor 96. The oil pressure controller 76 controls the oil pressure at the time of car starting and lockup, and, after the car has been started, rotates the rotor 96 to drive the cooling fan 94 and the electrically-driven oil-pump 90. The cooling fan 94 prevents the rise in temperature of the transmission 83 due to heat generated at the time when the lockup clutch 98 slips. The electrically-driven oil pump 90 absorbs oil from the oil pan 80 and supplies oil of an optimum pressure to the oil pressure circuit 79.

Another embodiment of the present invention will be explained in detail below.

Figure 18:
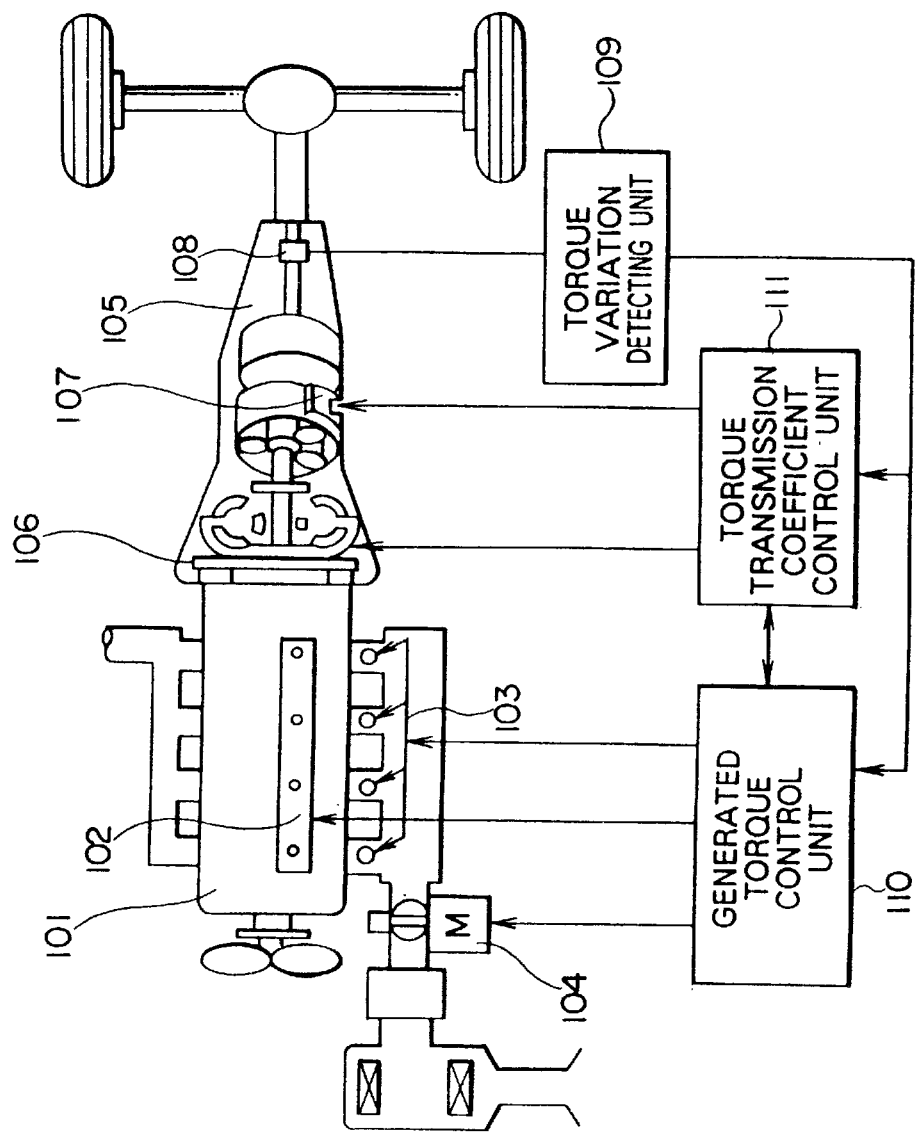
FIG. 18 is a block diagram for showing the control system of a car equipped with an automatic transmission having a fixed gear ratio.

FIG. 18 shows one embodiment of the present invention. A torque generated by an engine 101 is controlled by three units of an ignition unit 102 for controlling an ignition timing, a fuel unit 103 for controlling a fuel quantity or the fuel flow of the cylinders and a throttle valve control unit 104 for controlling air-fuel ratio. An increase or decrease of the driving torque in an automatic transmission 105 is controlled by a lockup mechanism 106 and a speed changing mechanism 107. In an automobile car equipped with the torque control apparatus as described above, a signal of a torque variation detecting unit 109 which obtains a torque variation of the driving system from the signal of a torque sensor 108 is inputted to a torque control unit 110 for controlling a generated torque and a torque transmission coefficient control unit 111, to prevent a booming noise at the time of controlling a lockup.

Figure 19:
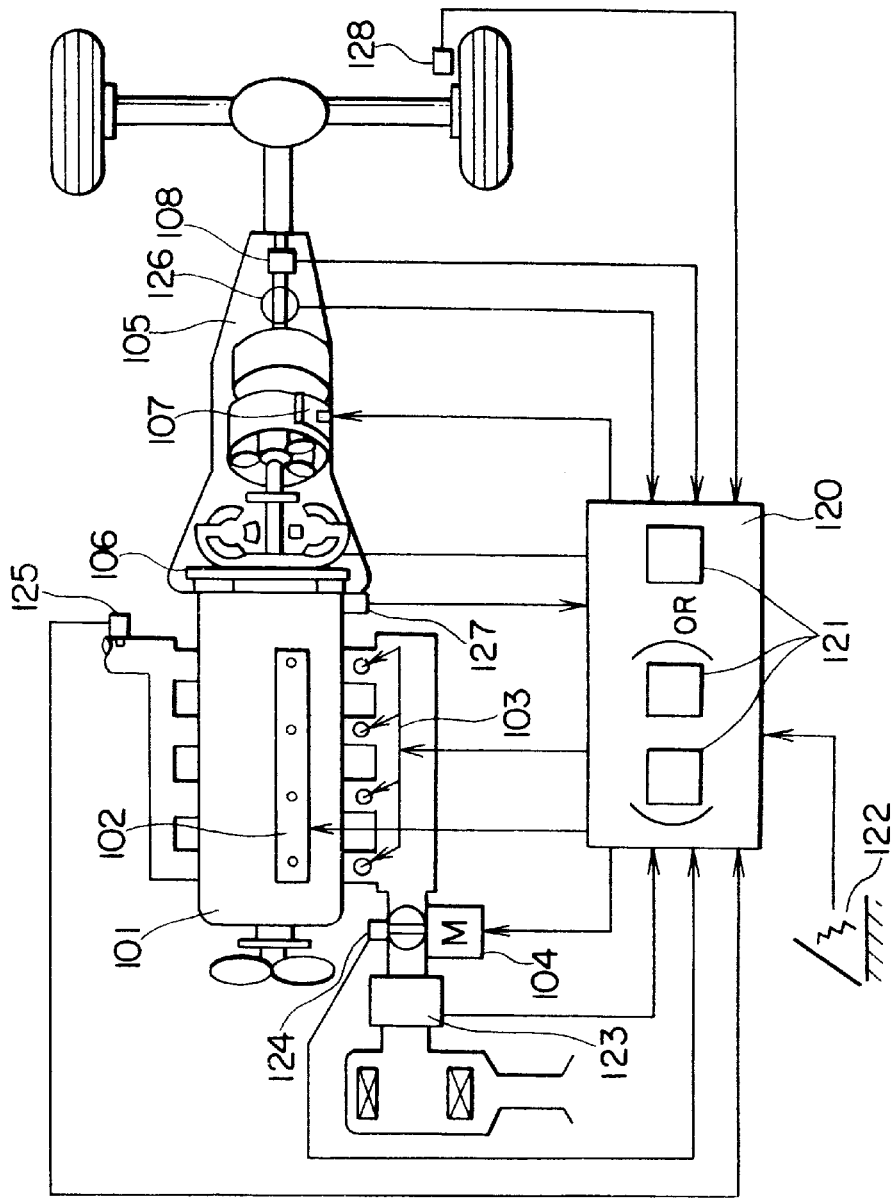
FIG. 19 is a block diagram for showing further details of the embodiment shown in FIG. 18.

FIG. 19 shows a further detailed configuration of the embodiment shown in FIG. 18. One or two CPU's 121 (Central Processing Units) are mounted on a controller 120. When two CPU's are mounted, control of the transmission ratio and control of the air-fuel ratio are carried out separately by these two CPU's. The controller 120 is supplied with an accelerator pedal angle signal a from an acceleration sensor 122, an air flow rate signal $Q_a$ from an air flow rate sensor 123, a throttle valve opening signal θ from a throttle valve sensor 124, an air-fuel ratio A/F signal from an air-fuel ratio sensor 125, a car speed signal $V_{sp}$ from a car speed sensor 126, an engine speed signal Ne from a crank angle sensor 127, a torque variation signal from the torque sensor 108 and a wheel speed signal $V_{fr}$ from a wheel speed sensor 128. The controller 120 controls the ignition unit 102, the fuel unit 103, the throttle valve controlling unit 104, the lockup mechanism 106 and the speed changing mechanism 107, to meet both drivability and the fuel economy.

Figure 20:
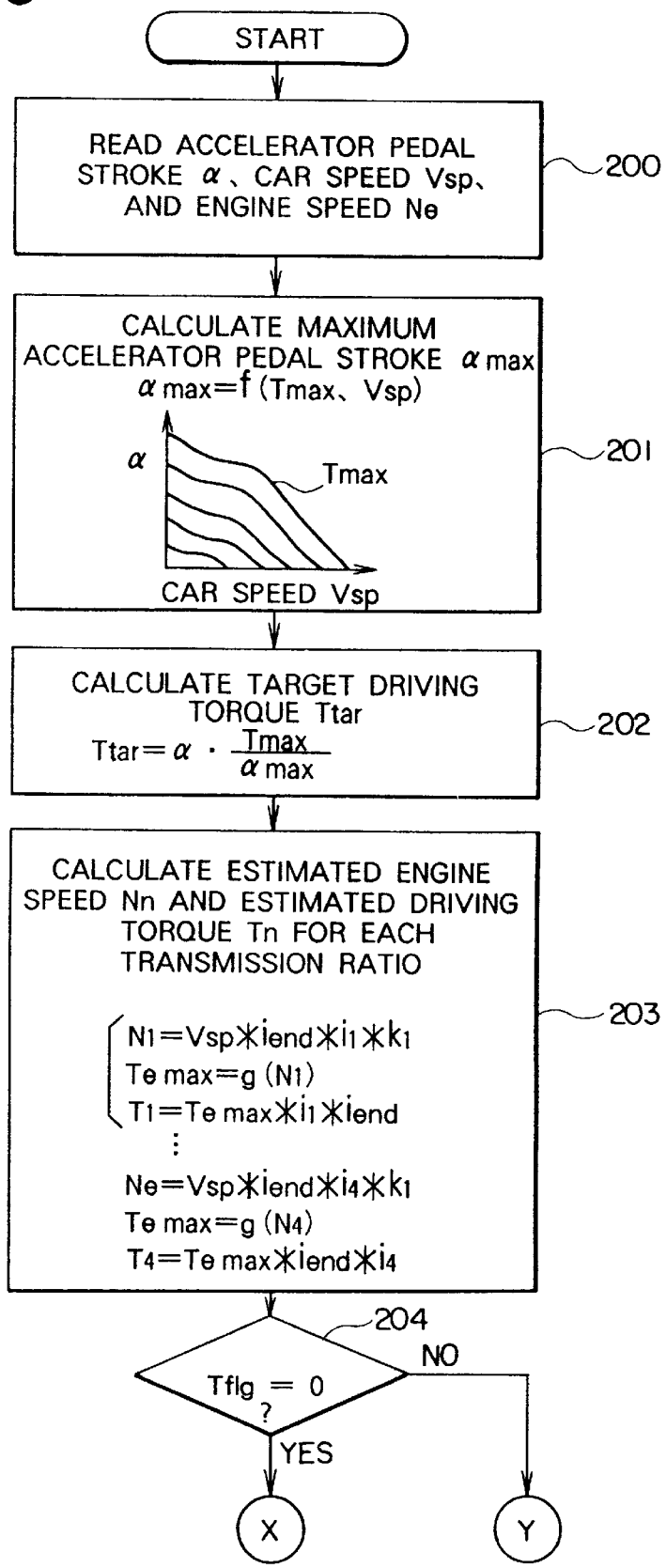
FIG. 20 is a part of the control flowchart in another embodiment of the present invention.
Figure 21:
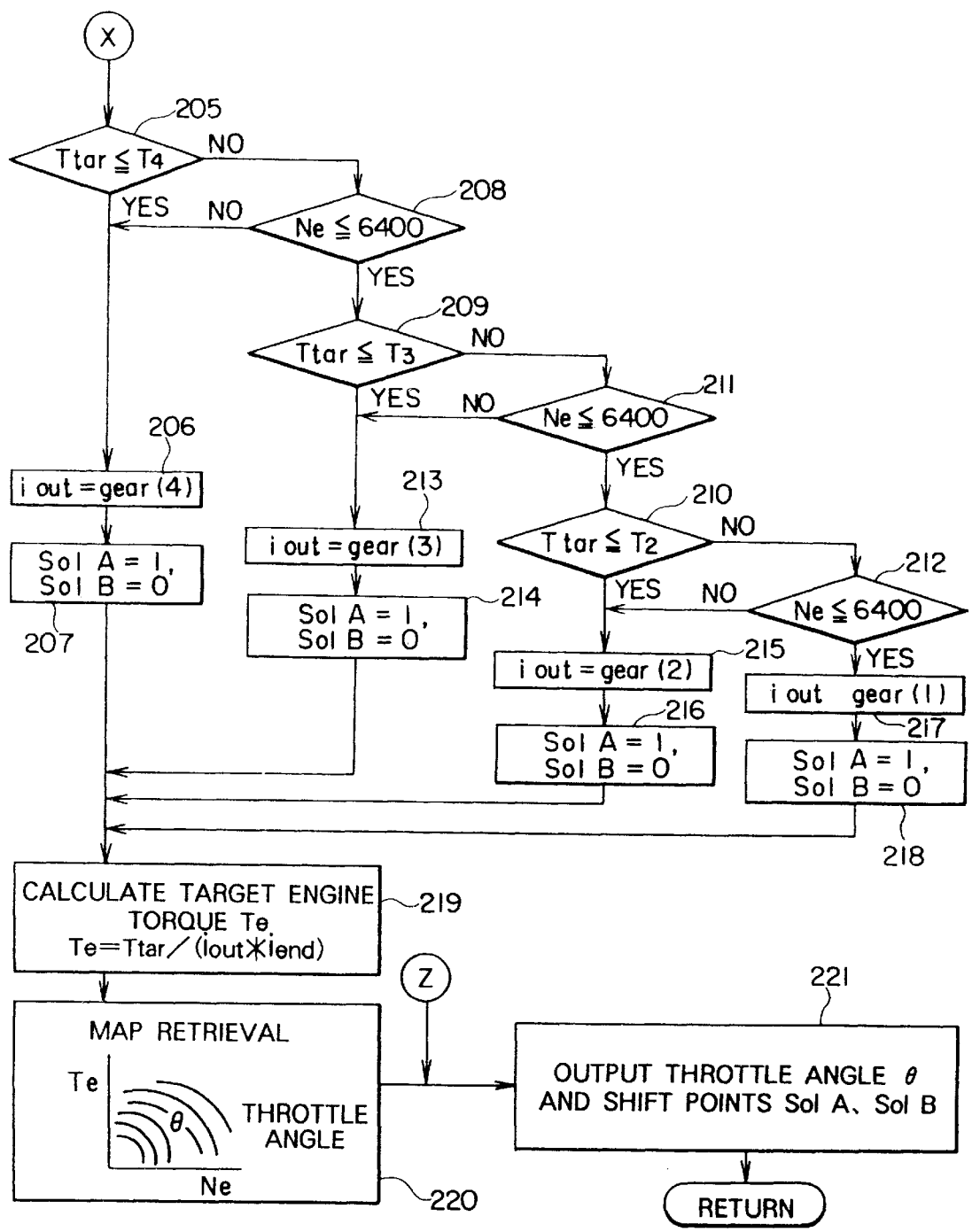
FIG. 21 is a part of the control flowchart in the above another embodiment of the present invention which is to be combined with the flow of FIG. 20.
Figure 22:
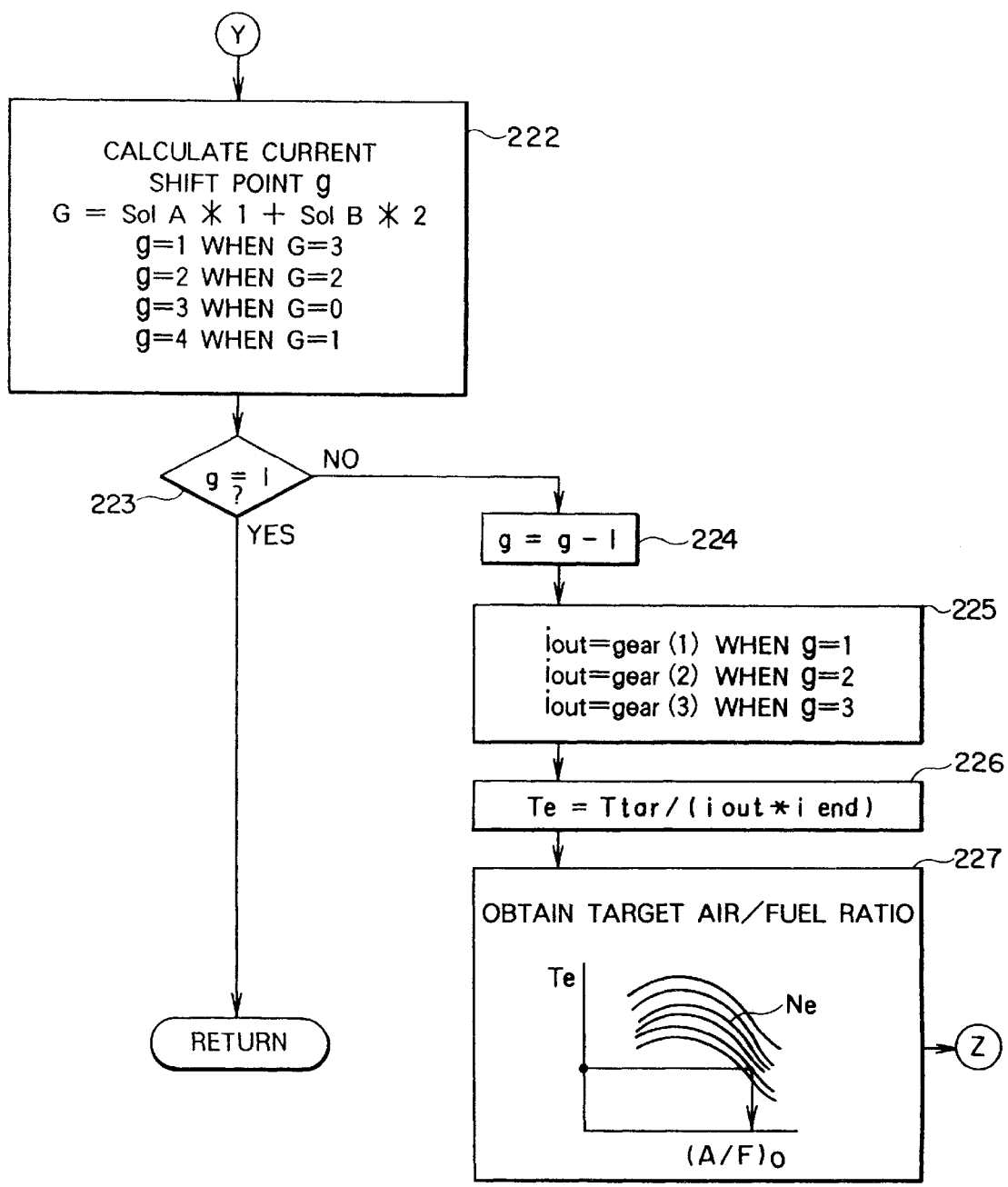
FIG. 22 is a part of the control flowchart in the above-described another embodiment of the present invention which is to be combined with the flow of FIG. 20 and FIG. 21.

FIGS. 20 to 22 show main flowcharts of the control of the engine and the transmission according to another embodiment of the present invention. The transmission of the present embodiment has a plurality of fixed different gear ratios. At step 200, an accelerator pedal angle α, a car speed $V_{sp}$ and an engine speed Ne are read. At step 201, based on a map of the accelerator pedal angle for each car speed level, a maximum accelerator pedal angle $α_{max}$ is calculated from the function f of a maximum value $T_{max}$ of the driving torque and a car speed Vsp corresponding to each accelerator pedal angle. At step 202, a target driving torque $T_{tar}=\alpha * T_{max}/\alpha_{max}$ is obtained by calculation. At step 203, an estimated engine speed $N_n$ and an estimated driving torque $T_n$ are calculated. For example, in the case of the first speed level, an estimated engine speed $N_1$ at the first speed level=Vsp * $i_{end}$ (the final speed reduction ratio)*$i_1$ (a speed reduction ratio at the first speed level)*$k_1$ (a correction coefficient) is obtained, and a maximum engine torque $Te_{max}$ at the above estimated engine speed is obtained from $g(N_1)$ (where $N_1$ is an engine speed) based on the map for showing the relationship between the engine speed and the engine torque. Then, an estimated driving torque $T_1=Te_{max}\times i_{end}$ (the final speed reduction ratio)*$i_1$ (a speed reduction ratio at the first speed level) is calculated. The above calculation is carried out for four speed levels if the transmission has four speed levels.

At step 204, a decision is made whether there is a torque variation or not, depending on whether the flag $T_{flg}$ for showing the torque variation is "0" or not. When the flag $T_{flg}$ is "0", there is no torque variation and the step moves to X (FIG. 21). When the flag $T_{flg}$ is "1", there is a torque variation, and the step proceeds to Y (FIG. 22). In FIG. 21, at step 205, the target driving torque $T_{tar}$ obtained in FIG. 20 and an estimated driving torque $T_4$ are compared. When $T_{tar}$ is not higher than $T_4$, a speed reduction ratio gear (4) of the fourth speed level is inputted to $i_{out}$ at step 206. At step 207, shift points $S_{01}$ A=1 and $S_{01}$ B=0 of the fourth speed level are inputted. When the $T_{tar}$ is larger than $T_4$ at the step 205, a decision is made at step 208 whether the engine speed Ne does not exceed a speed limit (for example, 6,400 rpm) or not and a over running of the engine is prevented. At step 209 and step 210, shift points are decided in the same manner as in the step 205. At step 211 and step 212, the same processing as in the step 208 is carried out. The processing same as the one for the above-described fourth speed level is carried out for the third speed level at steps 213 and 214, for the second speed level at steps 215 and 216 and for the first speed level at steps 217 and 218, respectively. At step 219, a target engine torque Te is obtained from $T_{tar}/(i_{out}*i_{end})$. At step 220, a throttle valve opening θ is obtained from the engine speed Ne and the map of the throttle valve opening θ of the engine torque Te. At step 221, the throttle valve opening θ and the shift points $S_{01}$A and $S_{01}$B are outputted. In FIG. 22, at step 222, the current shift point g is calculated based on the shift point signals $S_{01}$A and $S_{01}$B. At step 223, a decision is made whether the current shift position g is the first speed level or not. The step returns when g is the first speed level. When g is not in the first speed level, g−1 is calculated at step 224 and the position is shifted down. At step 225, a speed reduction ratio gear (n) which meets the shift point is inputted to $i_{out}$. At step 226, an engine torque Te is calculated in the same manner as in step 219. At step 227, a target air-fuel ratio (A/F) which meets the engine torque Te is obtained from the map of the relationship between the engine torque Te in which the engine speed Ne is a parameter and the target air-fuel ratio (A/F), and the obtained target air-fuel ratio (A/F) is used for an engine control to be described later. The step then returns to Z in FIG. 21.

Figure 23:
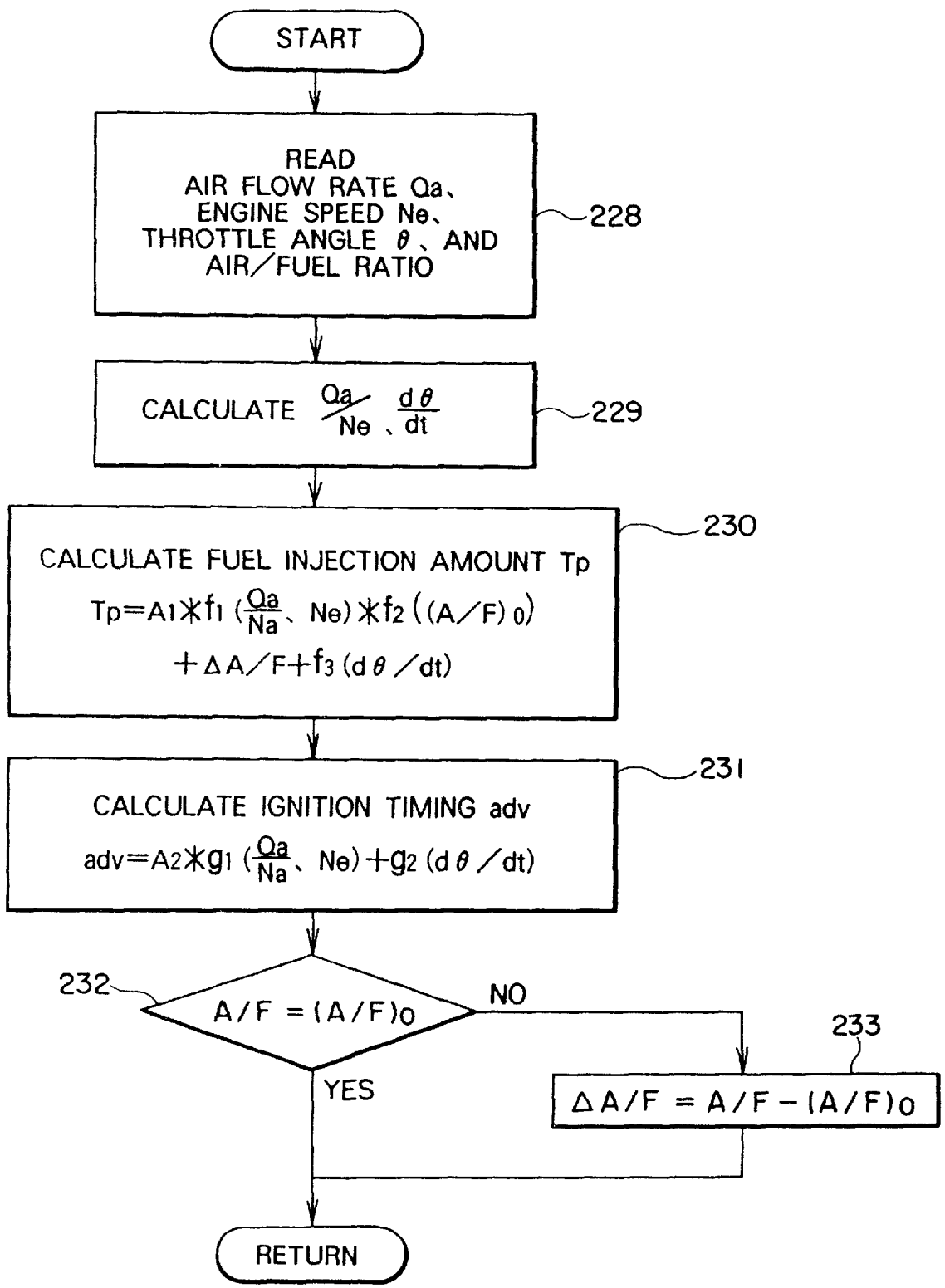
FIG. 23 is a control flowchart of the fuel flow quantity and the ignition timing according to the control method of the present invention.
Figure 24:
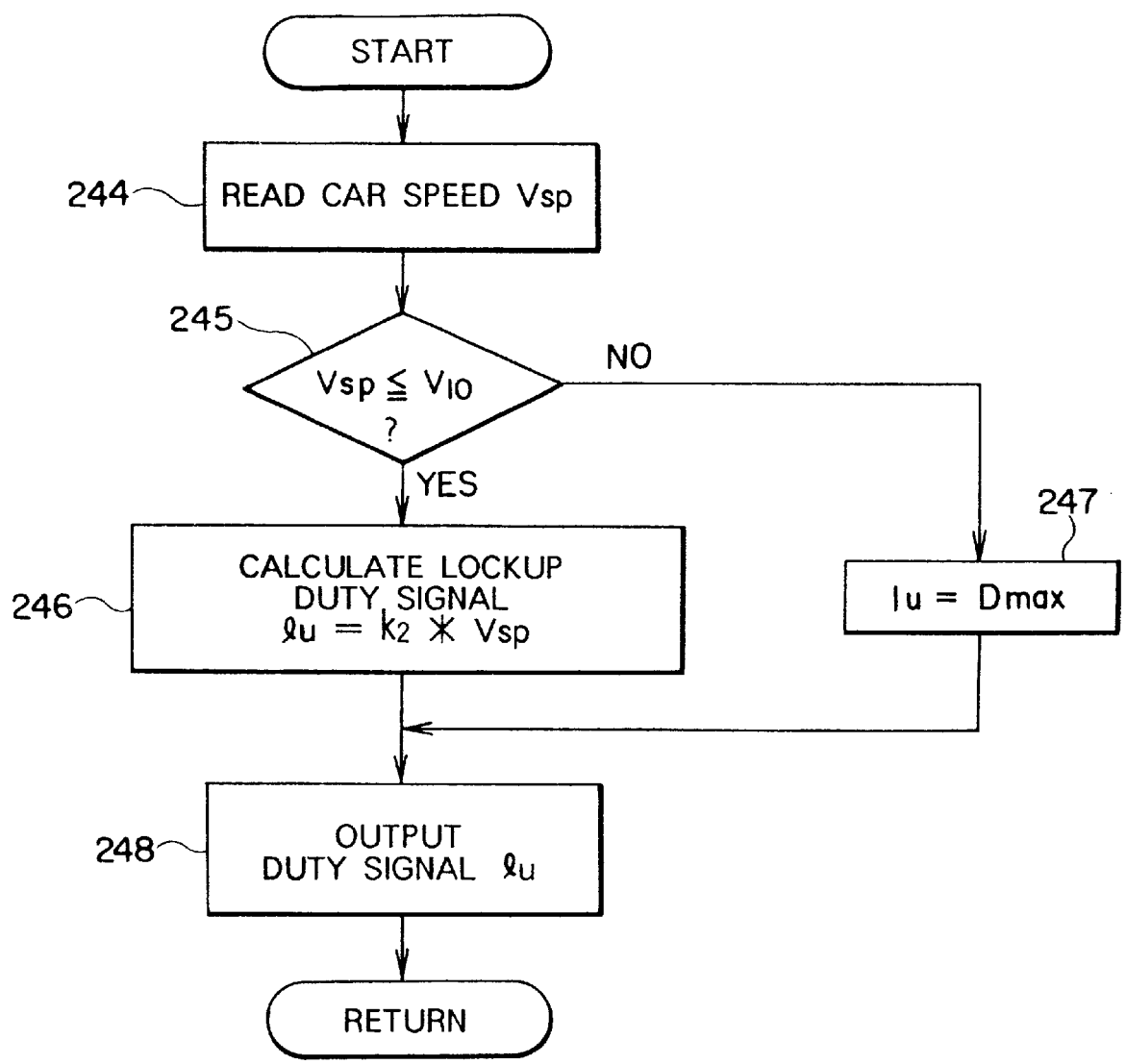
FIG. 24 is a flowchart for showing an embodiment of the control of the cancellation (disengagement) of the lockup clutch.

FIG. 23 shows a flowchart of fuel and ignition controls in the car control unit according to the present invention. At step 228, an air flow rate Qa, an engine speed Ne, a throttle valve opening θ and an air-fuel ratio A/F are read. At step 229, Qa/Ne and dθ/dt are calculated. Next, at steps 230 and 231, a fuel injection amount $T_p$ and an ignition timing adv are obtained by the following expressions respectively:

$Tp=A_1$ (correction coefficient) * $f_1$ $(Qa/Ne, Ne)$ * $f_2$ $((A/F)_o)$ (air-fuel ratio correction coefficient)+$\Delta A/F$ (air-fuel ratio correction quantity)+$f_3$ $(d\theta/dt)$ (acceleration correction quantity)

$adv=A_2$(correction coefficient)·$g_1(Qa/Ne,Ne)$+$g_2(d\theta/dt)$(acceleration correction quantity)

Next, at step 232, an actual air-fuel ratio A/F is compared with the target air-fuel ratio $(A/F_o)$. If they coincide with each other, the step returns. If they do not coincide, an air-fuel ratio correction quantity $\Delta A/F$ is obtained at step 233, and the step returns.

Regardless of whether the above-described control for the restriction of a booming noise is being carried out or not, it is necessary to disengage the lockup clutch at the time when the car starts running or when the speed is being changed if the transmission has the fixed gear ratios, and it is necessary to disengage the lockup clutch at the time when the car starts running or when the car is running at a low speed rate in the case of the CVT. This is necessary to prevent an engine stall and to reduce a shock due to a speed change.

Figure 25:
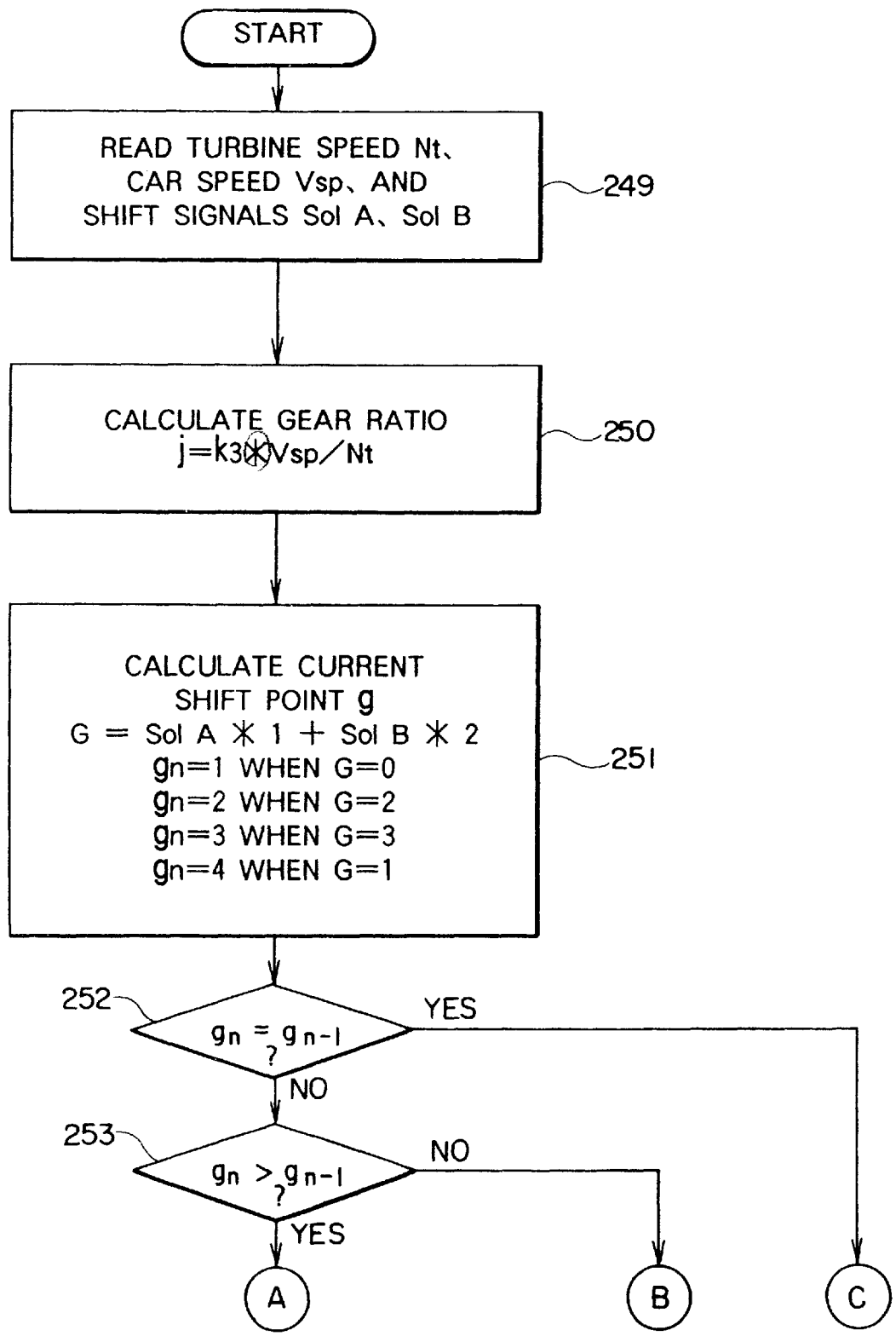
FIG. 25 is a flowchart for showing another embodiment of the control of the cancellation of the lockup clutch.
Figure 26:
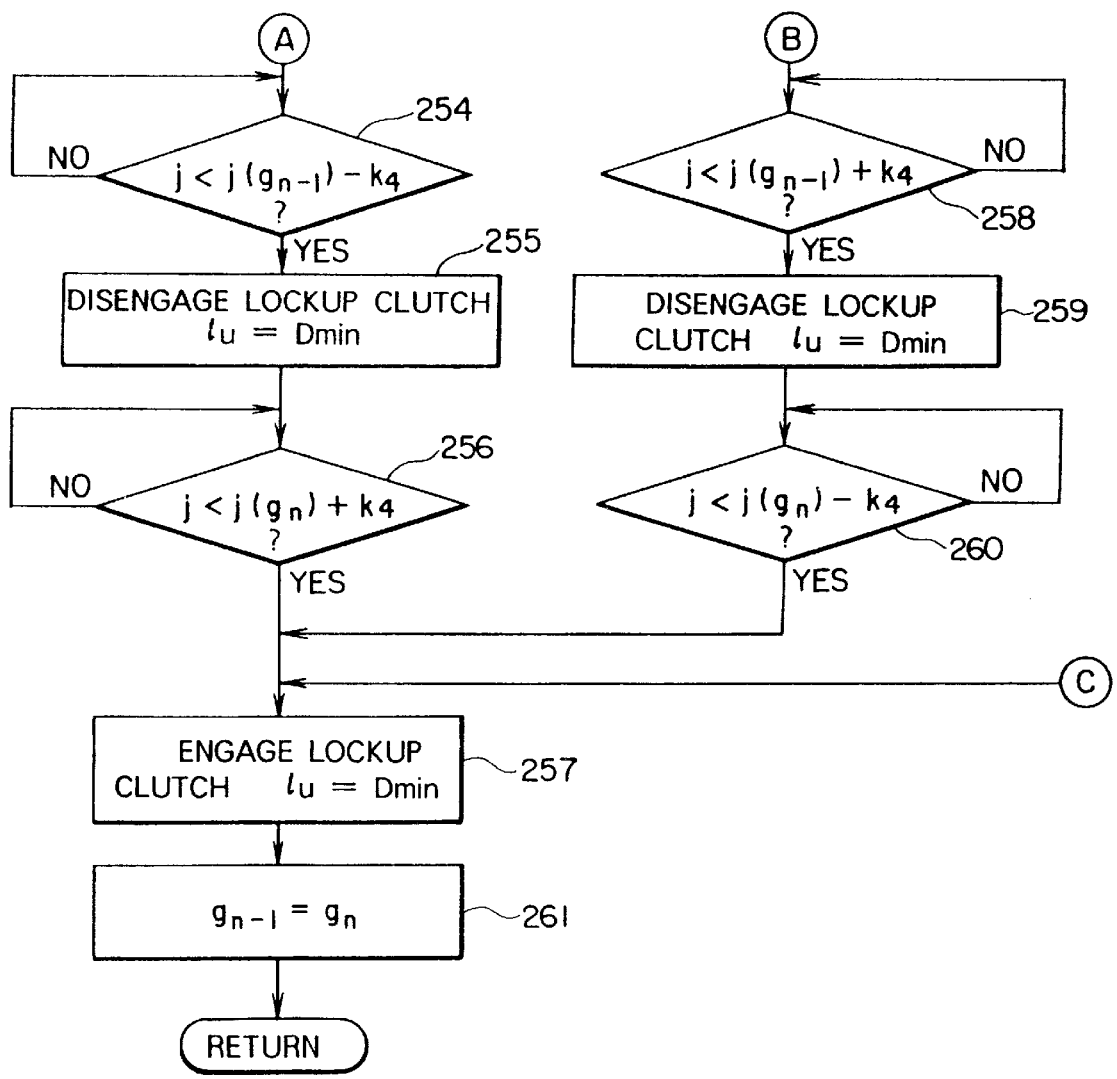
FIG. 26 is a flowchart for showing another embodiment of the control of the cancellation of the lockup clutch.
Figure 27:
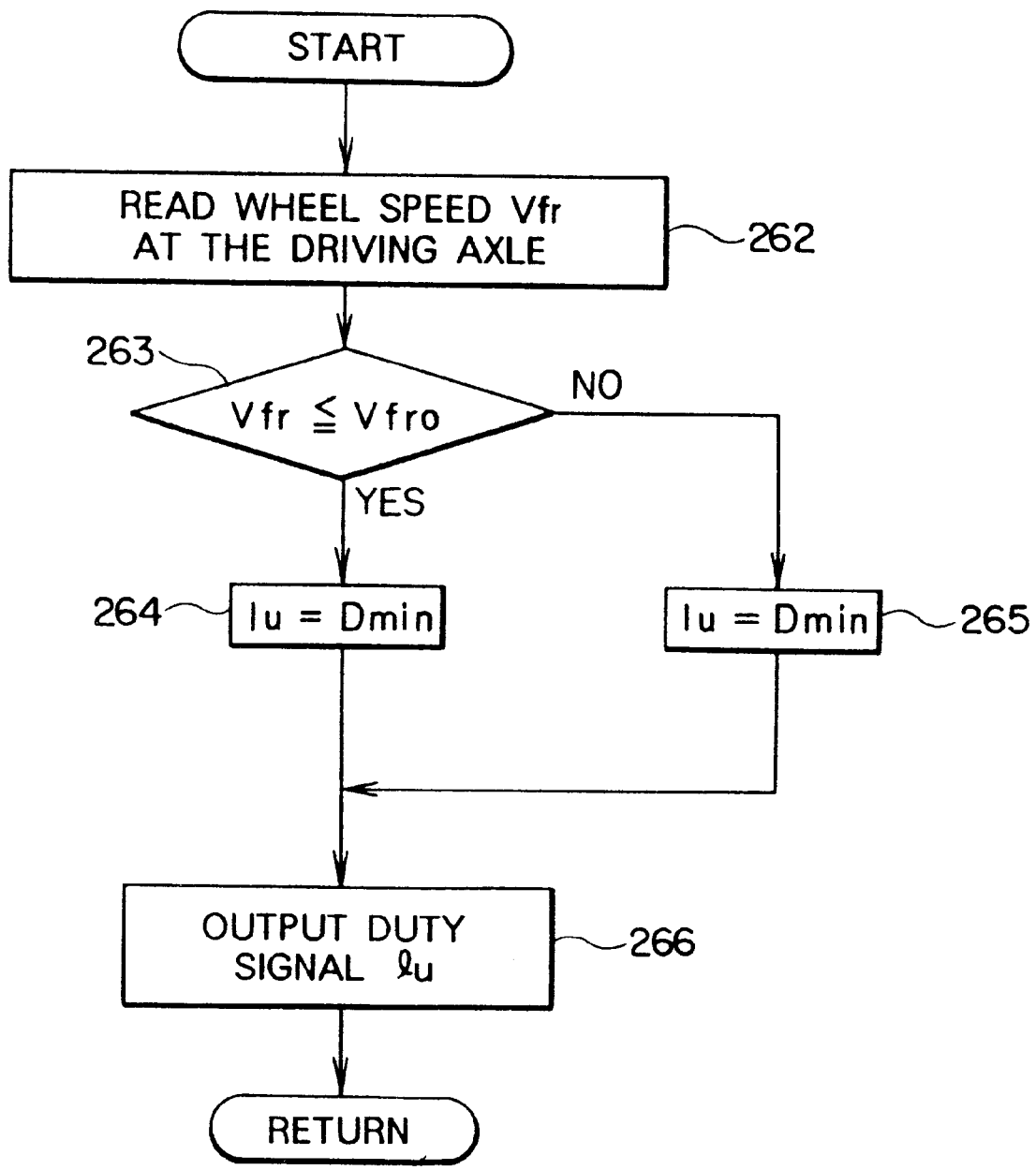
FIG. 27 is a flowchart for showing another embodiment of the control of the cancellation of the lockup clutch.

FIGS. 24 to 27 show flowcharts when a lockup clutch is to be disengaged. FIG. 25 shows a case when a lockup clutch at the time of a low-speed running of a car is to be disengaged. At step 244, a car speed Vsp is read, and at step 245, a decision is made whether the car speed Vsp is not higher than a set car speed $V_{10}$ (about 10 km/h) or not. When the Vsp is not higher than the set car speed $V_{10}$, a duty ratio 1 u of the lockup is obtained by a car speed Vsp*$k_2$ (a correction coefficient) at step 246. When the Vsp is higher than the $V_{10}$, a maximum duty rate $D_{max}$ is inputted as 1 u at step 247. At step 248, a duty signal 1 u is outputted. FIGS. 26 and 27 show the case for disengaging the lockup clutch at the time when the car speed is being changed. At step 249, a speed Nt of a turbine (an output shaft of the torque converter), a car speed Vsp and shift point signals $S_{01}$A and $S_{01}$,B are read. At step 250, a gear ratio j, including the gear ratio during a speed change is obtained by $k_3$ (correction coefficient)*Vsp/Nt. Next, at step 251, the current shift point gn is obtained from the shift point signals $S_{01}$A and $S_{01}$B. At step 252, the last shift point $g_{n-1}$ is compared with the current shift point $g_n$. If the $g_{n-1}$ and $g_n$ are not the same, the process proceeds to step 253, where a decision is made whether the current shift point $g_n$ is larger than the preceding shift point $g_{n-1}$. If the $g_n$ is larger than the $g_{n-1}$, that is, if the shift-up was made, the process proceeds to A. If the $g_n$ is smaller than the $g_{n-1}$, that is, if the shift-down was made, the process proceeds to B. In FIG. 26, in the case of A (that is the shift-up), at step 254, the gear ratio j obtained at the step 250 is compared with a target gear ratio $j(g_{n-1})-k_4$ (a correction coefficient) when the control is to be started. If the j is larger than the j $(g_{n-1})-k_4$, the process is looped. When the j becomes smaller than the j$(g_{n-1})-k_4$ after repeating the loop, the process goes to step 255, where a minimum duty ratio $D_{min}$ for disengaging the lockup clutch is inputted as the duty ratio 1 u of the lockup. Next, at step 256, the gear ratio j compared with a target gear ratio j(gn)+$k_4$ (a correction coefficient) when the control is to be ended. If the j is smaller than the j $(g_n)+k_4$, the process is looped. When the j becomes larger than the j (gn)+$k_4$ after repeating the looping, the process goes to step 257 and a maximum duty ratio $D_{max}$ for engaging the lockup clutch is inputted as the duty ratio of the lockup. In the case of B (that is, the shift-down), the steps 258 to 260 are executed in the same manner, and a decision is made about the speed change and thus disengaging the lockup clutch. Last, at step 261, the current shift point $g_n$ is inputted to the shift point $g_{n-1}$ of the preceding time, and the process ends. FIG. 27 shows a flowchart of the disengaging of a lockup clutch when a sudden brake has been applied. At step 262, a wheel speed $V_{fr}$ at the driving side is read. At step 263, the $V_{fr}$ is compared with a set wheel speed $V_{fro}$. If the wheel speed $V_{fr}$ is not higher than the set wheel speed $V_{fro}$, a decision is made that the wheels have been locked as a result of jamming on the brakes. At step 264, a minimum duty ratio $D_{min}$ for disengaging the lockup clutch is inputted as the duty ratio 1 u of the lockup. If the $V_{fr}$ is larger than the $V_{fro}$, a maximum duty ratio $D_{max}$ for engaging the lockup clutch is inputted as the duty ratio 1 u of the lockup at step 265. At step 266, the duty ratio 1 u of the lockup is outputted.

Figure 28:
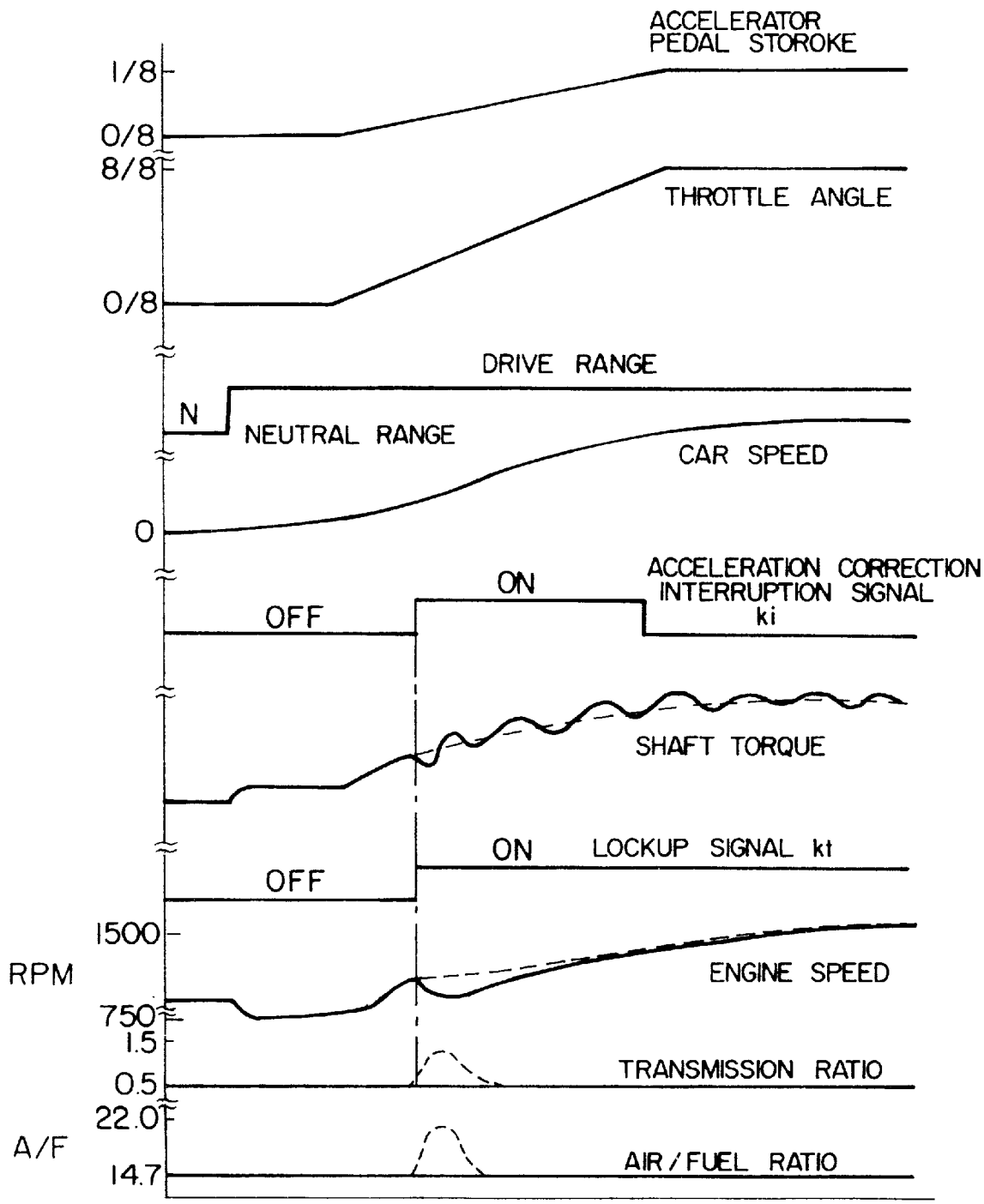
FIG. 28 is a timechart for showing the change of the signal of each portion when the lockup clutch is engaged.

FIG. 28 shows a timechart for starting the engaging of the lockup clutch. After the driver has started the engine while the shift lever of the automatic transmission is positioned in N (neutral) or P (parking), he monitors, based on an N-D range signal, to check if the shift state has been changed to a D (drive) range state. Normally, the car speed is zero km/h in the N (neutral) or P (parking) state because the brake pedal is kept being depressed in this state. The engine speed in this case is about 700 rpm, which is an idle speed. When the driver releases the brake pedal and, at the same time, the N-D range signal has been changed to the D range, the torque of the torque converter increases and a shaft torque which overcomes the running resistance and car inertia weight occurs. Then, the car starts running and the car speed increases. When the stroke of the acceleration pedal is suddenly changed from this state (for example from 0/8 to 1/8), the throttle valve is opened to almost the full open state to improve fuel economy with boost operation of the engine. In this case, an acceleration correction interruption signal $k_i$ is being monitored. When an acceleration correction ($k_i$=1) has been inputted, a lockup signal $l_u$=1 is outputted to engage the lockup clutch. With the above-described arrangement, when a shaft torque has changed, the air-fuel ratio and the transmission ratio, for example, are controlled to prevent a variation of the shaft torque as shown by a broken line.

Figure 29:
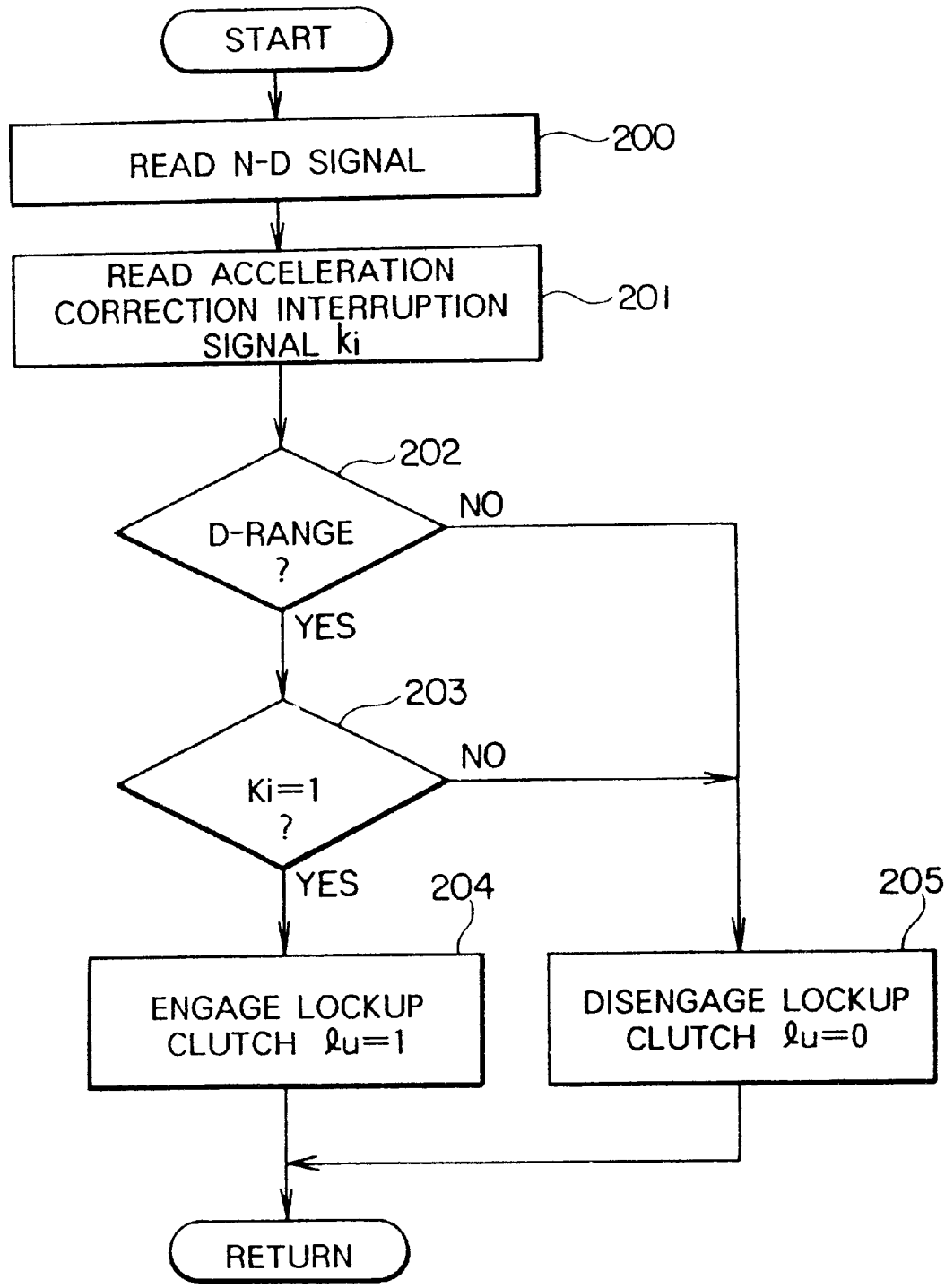
FIG. 29 is a flowchart for showing an embodiment of the control of engaging the lockup clutch.

FIG. 29 shows a flowchart for controlling the starting of the engagement of the lockup clutch. At steps 200 and 201, an N-D signal and an acceleration correction interruption signal ki are read respectively. At step 202, a decision is made whether the shift lever is in the D range or not. If the shift lever is in the D range, a decision is made whether the $k_i$ is 1 or not at step 203. if the $k_i$ is 1, the lockup is allowed, and at step 204, a lockup engagement signal lu=1 is outputted. If the decision is "No." at the steps 202 and 203, the process proceeds to step 205, where a lockup cancellation signal lu=0 is outputted, and the process is returned.

Figure 30:
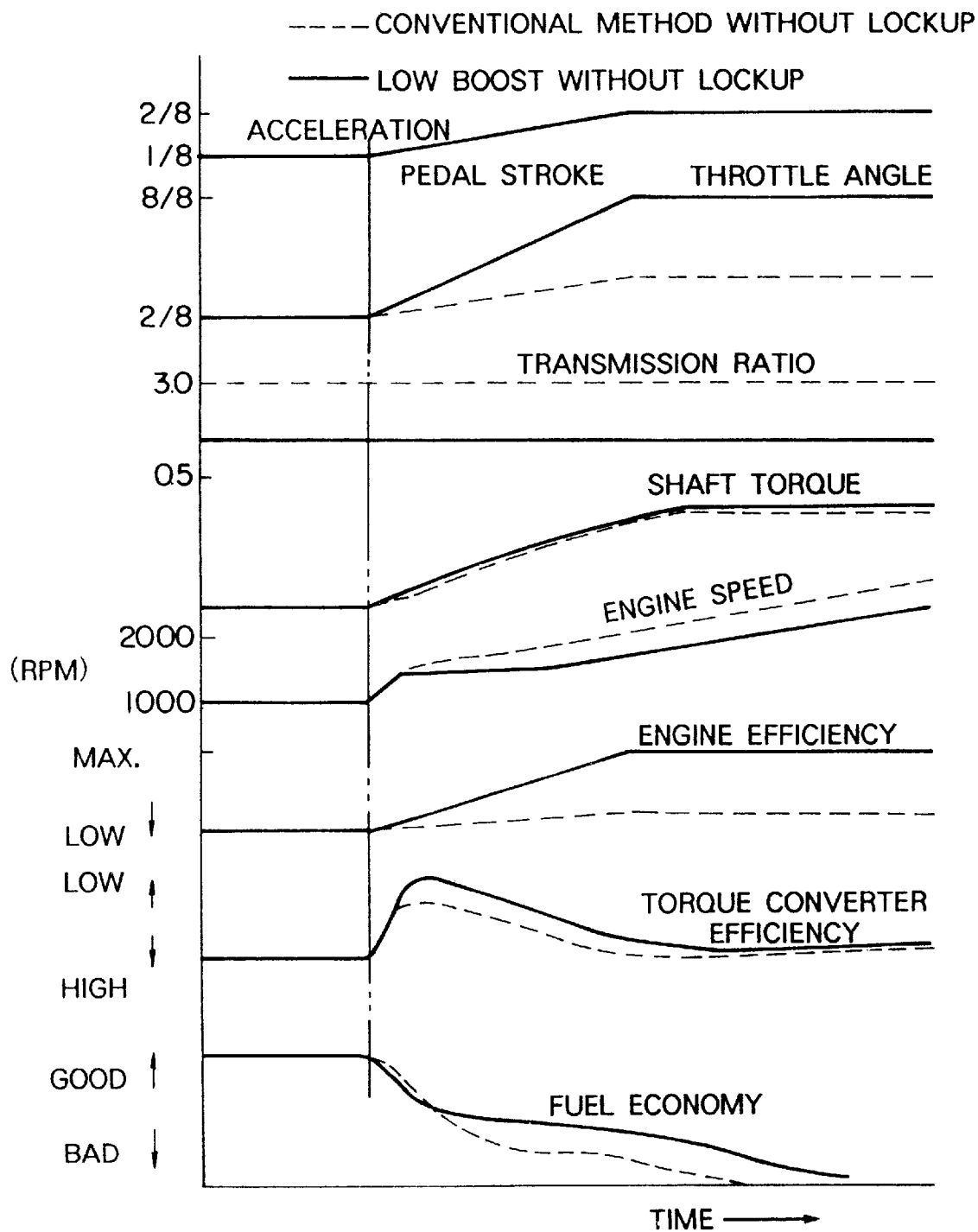
FIG. 30 is a timechart which compares the signal changes of each portion depending on presence or absence of the lockup clutch.

FIG. 30 shows a comparative timechart for comparing efficiencies between the conventional method in which no lockup is included (shown in broken lines) and the low boost operation without a lockup (shown in solid lines). In the case of the broken lines, the throttle valve opening change corresponds to a change of the accelerator pedal angle at the ratio 1:1 and the transmission is in the low gear ratio. Therefore, a change of the shaft torque is small. However, since the opening of the throttle valve is small, the engine efficiency is low. Further, the efficiency of the torque converter is also low so that the fuel economy is poor. On the other hand, in the case of the solid lines, the throttle valve opens to the full for a change of the pedal stroke so that the engine efficiency becomes the highest. However, since the shaft torque is matched to the conventional method, the transmission is in the high gear ratio. Thus, the efficiency of the torque converter becomes worse than that according to the conventional method. Nonetheless, since the efficiency of the engine is the highest, the fuel economy is better than that according to the conventional method.

Figure 31:
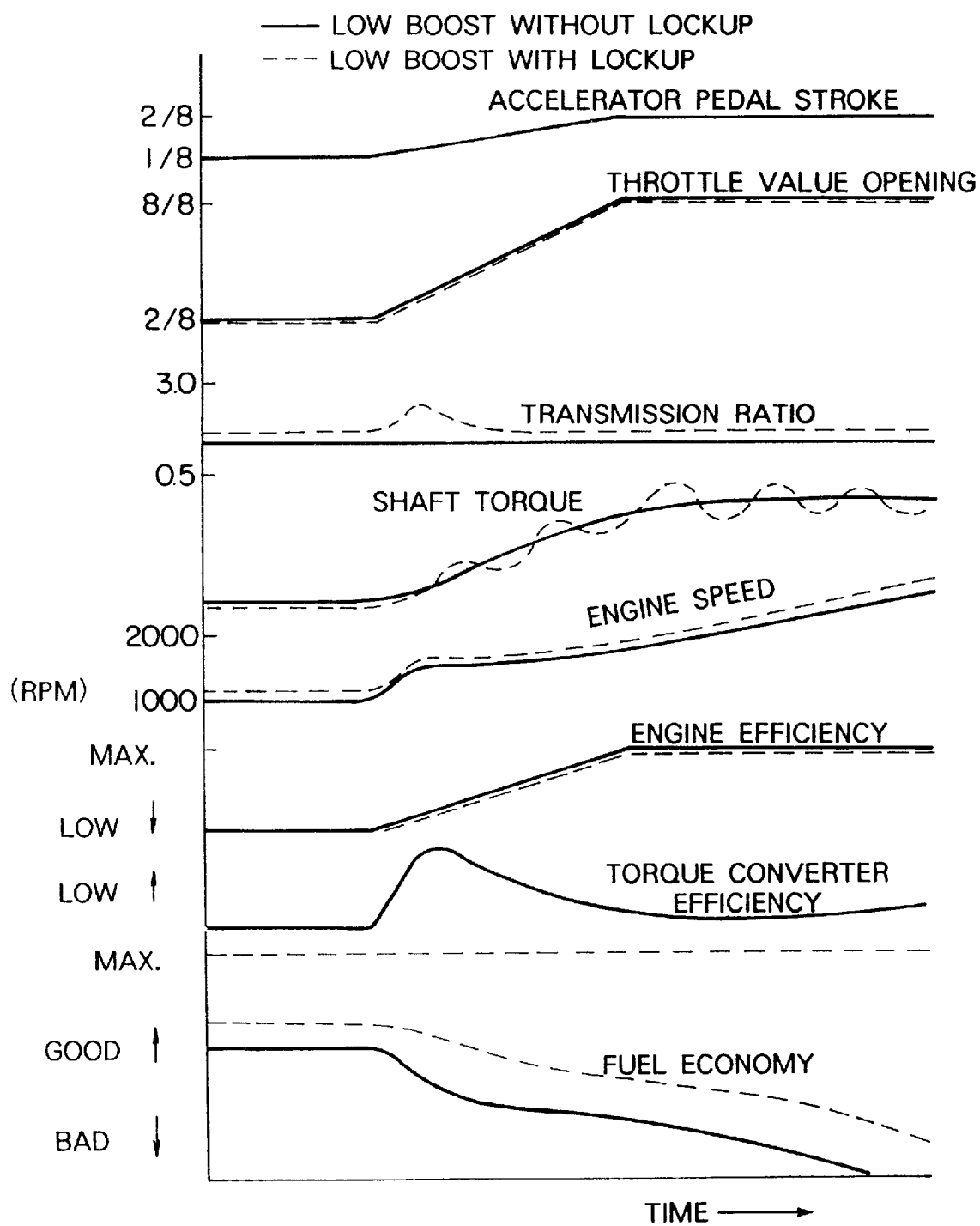
FIG. 31 is a timechart which compares the signal changes of each portion depending on presence or absence of the lockup clutch.

FIG. 31 shows a comparative timechart for comparing the efficiencies of the low boost operation between the cases with and without (shown in solid lines) the lockup. In both the broken lines and solid lines, the throttle valve is opened to the full for a change of the accelerator pedal stroke so that the engine efficiency is the highest. However, in the case of the solid lines, a slipping of the torque converter occurs and the shaft torque increases. Therefore, when the shaft torque same as that of the broken lines is to be outputted, the transmission is in the high gear ratio side. In other words, the efficiency of the torque converter is lowered to the worst direction. On the other hand, in the case of the broken lines, the transmission ratio is at a lower gear side than that of the solid lines. Thus, the fuel economy is improved substantially as the efficiency of the torque converter becomes the highest although the engine speed is a little higher. However, since the shaft torque varies and the drivability is aggravated, the fuel economy can not be achieved.

Figure 32:
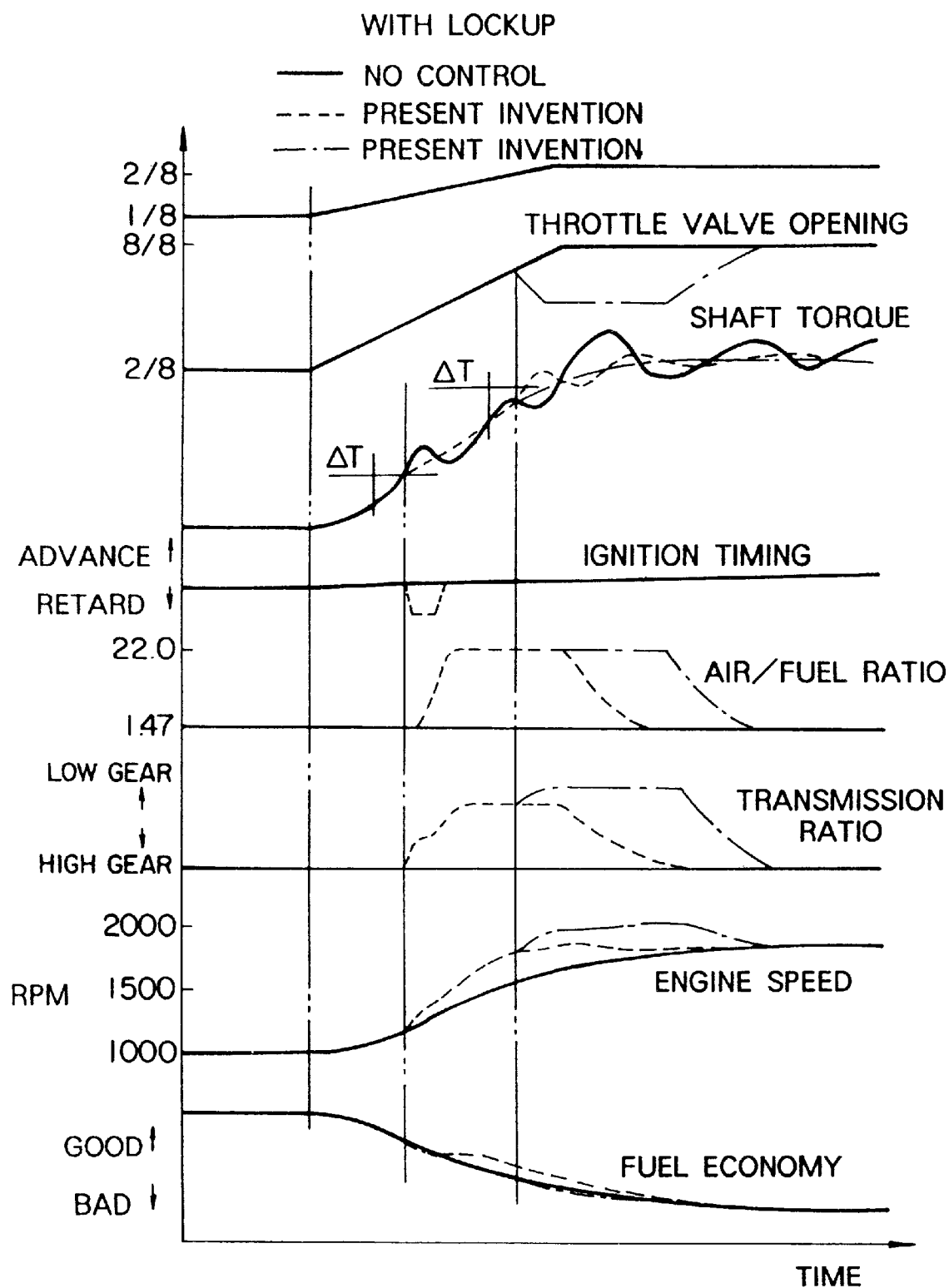
FIG. 32 is a timechart which shows the signal change of each portion in controlling a booming noise when the lockup clutch is engaged.

FIG. 32 shows a comparative timechart for comparing the efficiencies of the low boost operation with a lockup between the case for controlling the variation (shown in solid lines) and the case where there is no control of the variation (shown in broken lines and one-dot chain lines). In the case of the solid lines, the fuel economy is good as shown in FIG. 32 but the shaft torque changes. In the case of the broken lines where there is the control of torque variation, the state of torque variation is decided from a time change Δt of the shaft torque, and when the torque variation has exceeded target torque variation quantities $T_{min}$ and $T_{mid}$, an ignition timing retarding control and an air-fuel ratio control have been carried out. At first, the ignition timing is retarded and then the air-fuel ratio is returned. In this case, the engine torque becomes smaller by the ignition timing retarding control and the air-fuel ratio control, and therefore, it is necessary to change the transmission ratio to the low gear side to maintain the shaft torque requested by the driver. When a torque variation ($T_{max}$) larger than the above torque variation quantity has occurred (as shown in the one-dot chain lines), a throttle valve control is applied to the above air-fuel ratio control, to prevent the variation of the shaft torque. In all the cases of the solid lines, broken lines and one-dot chain lines, the fuel economy makes little difference. Thus, according to the present invention, it is possible to suppress torque variation in contrast to conventional systems without torque control as shown in FIG. 32, and to improve fuel economy substantially in contrast to conventional systems without lockup as shown in FIG. 31.

Figure 33:
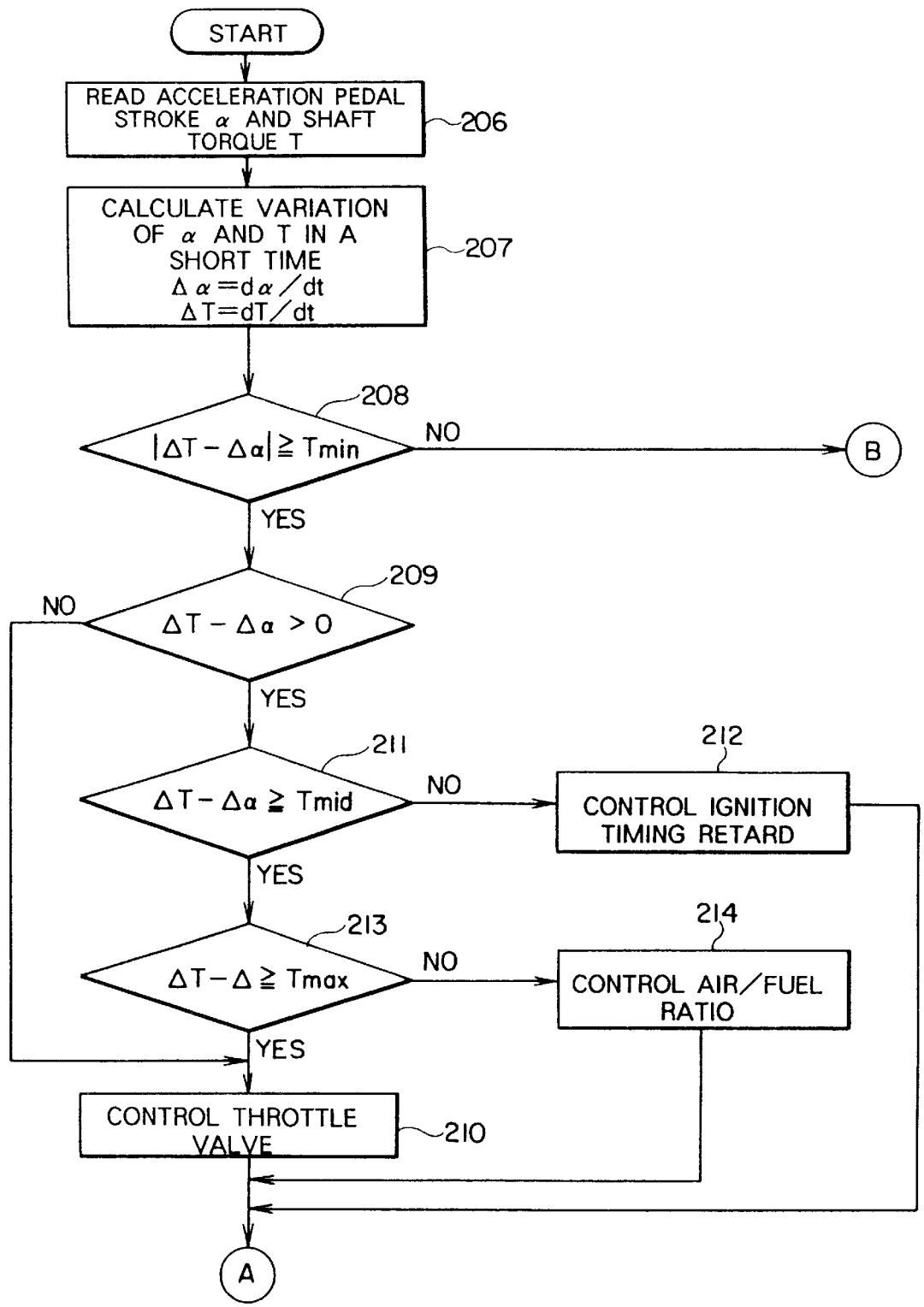
FIG. 33 is a flowchart for showing an embodiment for controlling torque variation.
Figure 34:
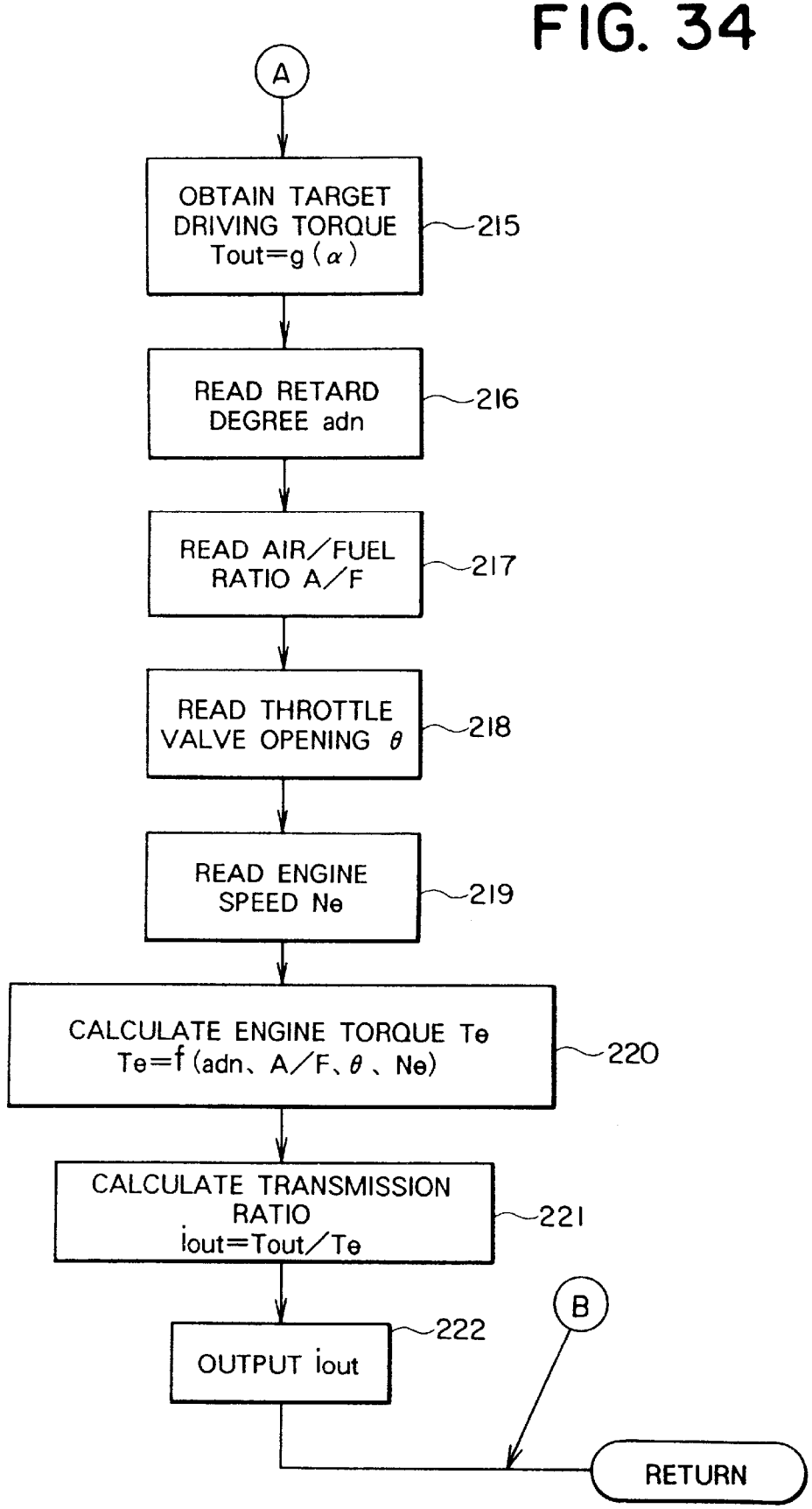
FIG. 34 is a flowchart for showing another embodiment for controlling torque variation.

FIGS. 33 and 34 show control flowcharts for controlling torque variations. At step 206, an accelerator pedal stroke a and a shaft torque T are read. Next, at step 207, changes of α and T per a small time period, that is, Δa=dα/dt and ΔT=dT/dt, are calculated. At step 208, a decision is made whether an absolute value |ΔT−Δα| is not smaller than a target torque variation quantity $T_{min}$ or not. If the |ΔT−Δα| is smaller than the $T_{min}$, that is, when a decision is made that there is no torque variation, the process goes to B and returns. If the |ΔT−Δα| is larger than the $T_{min}$, the process proceeds to step 209 and a decision is made whether the ΔT−Δα is larger than zero or not. When the ΔT−Δα is smaller than zero, a decision is made that the car speed is being reduced. At step 210, only the throttle valve control is carried out from the viewpoint of the exhaust emission control. When a decision is made at step 209 that ΔT−Δα is larger than zero, the process goes to step 211 and a decision is made whether the ΔT−Δα is not smaller than a target torque variation quantity $T_{mid}$ or not. When a decision is made that the ΔT−Δα is smaller than the $T_{mid}$, the ignition timing retarding control is carried out at step 212. When a decision is made that the ΔT−Δα is larger than the $T_{mid}$, the process goes to step 213 and a decision is made whether the ΔT−Δα is not smaller than a target torque variation quantity $T_{max}$ or not. When a decision is made that the ΔT−Δα is smaller than the $T_{max}$, a fuel control (air-fuel ratio control) is carried out at step 214. When a decision is made that the ΔT−Δ is not smaller than the $T_{max}$, a throttle valve control is carried out at step 210. Then the process proceeds to the steps in FIG. 34. At step 215, a target driving torque $T_{out}$ is obtained from a function g(α) of α. At steps 216 to 219, an ignition timing retarding quantity and, an air-fuel ratio A/F, a throttle valve opening θ and an engine speed Ne are read. At step 220, an engine torque Te is calculated from a function f (and, A/F, θ, Ne) of the above adv, A/F, θ and Ne. The engine torque Te may be obtained from the map using the above and, A/F, θ and Ne. At step 221, a speed change rate $i_{out}$ is obtained from the target driving torque $T_{out}$/engine torque $T_e$, and the result is outputted at step 222.

Next, the other embodiments of the change-over control of the lockup clutch between the engaging and disengaging (driving of the torque converter) of the lockup clutch will be explained. The operation of all of the following embodiments will be controlled by the computer program within the controller 15 in the configuration shown in FIG. 3.

Figure 35:
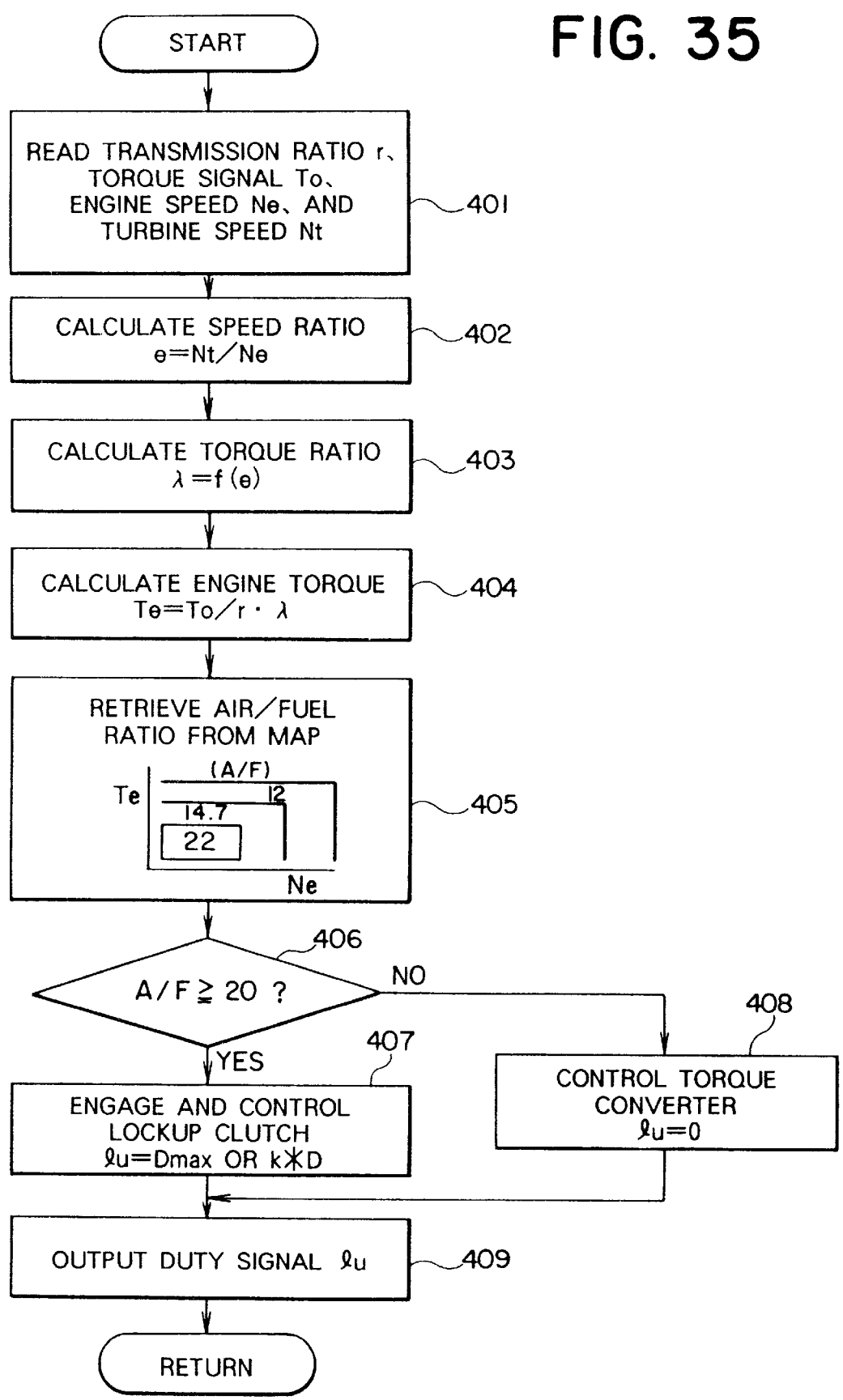
FIG. 35 is a flowchart for showing another embodiment of the control of the engaging and disengaging of the lockup clutch.

FIG. 35 shows a flowchart of the system for engaging the lockup clutch if the air-fuel ratio is within a specific area. At step 401, am transmission ratio r, an output signal To of the torque sensor 12, an engine speed signal Ne and a turbine speed Nt of the torque converter are read. At step 402, a transmission ratio e=Nt/Ne is calculated. At step 403, a torque ratio λ is obtained from a predetermined function λ=f(e). At step 404, an engine torque Te is obtained from Te=To/r·λ. At step 405, an equivalent air-fuel ratio map which uses, as parameters, the engine torque Te and the engine speed Ne, stored in the memory in advance, is referred to, and a decision is made of the value of the air-fuel ratio (A/F) under the calculated conditions of the engine torque Te and the engine speed Ne.

At step 406, a decision is made whether the air-fuel ratio is 20 or above. When the air-fuel ratio is not smaller than 20, the driving condition is in the lean burn operation area. At step 407, a duty ratio lu for controlling the engaging of the lockup clutch is decided. When the air-fuel ratio does not reach 20, a driving by the torque converter is carried out, and a duty ratio lu=0 is outputted at step 408. At step 409, the lockup actuator 21 is controlled based on the given duty ratio lu.

According to the control based on the operation flow shown in FIG. 35, the fuel economy is improved substantially because the lockup clutch is engaged only in the lean burn operation area in which the air-fuel ratio is at least 20.

Instead of the processing at the steps 401 to 405, the actual air-fuel ratio may also be detected directly from the output of the air-fuel ratio sensor 13.

Figure 36:
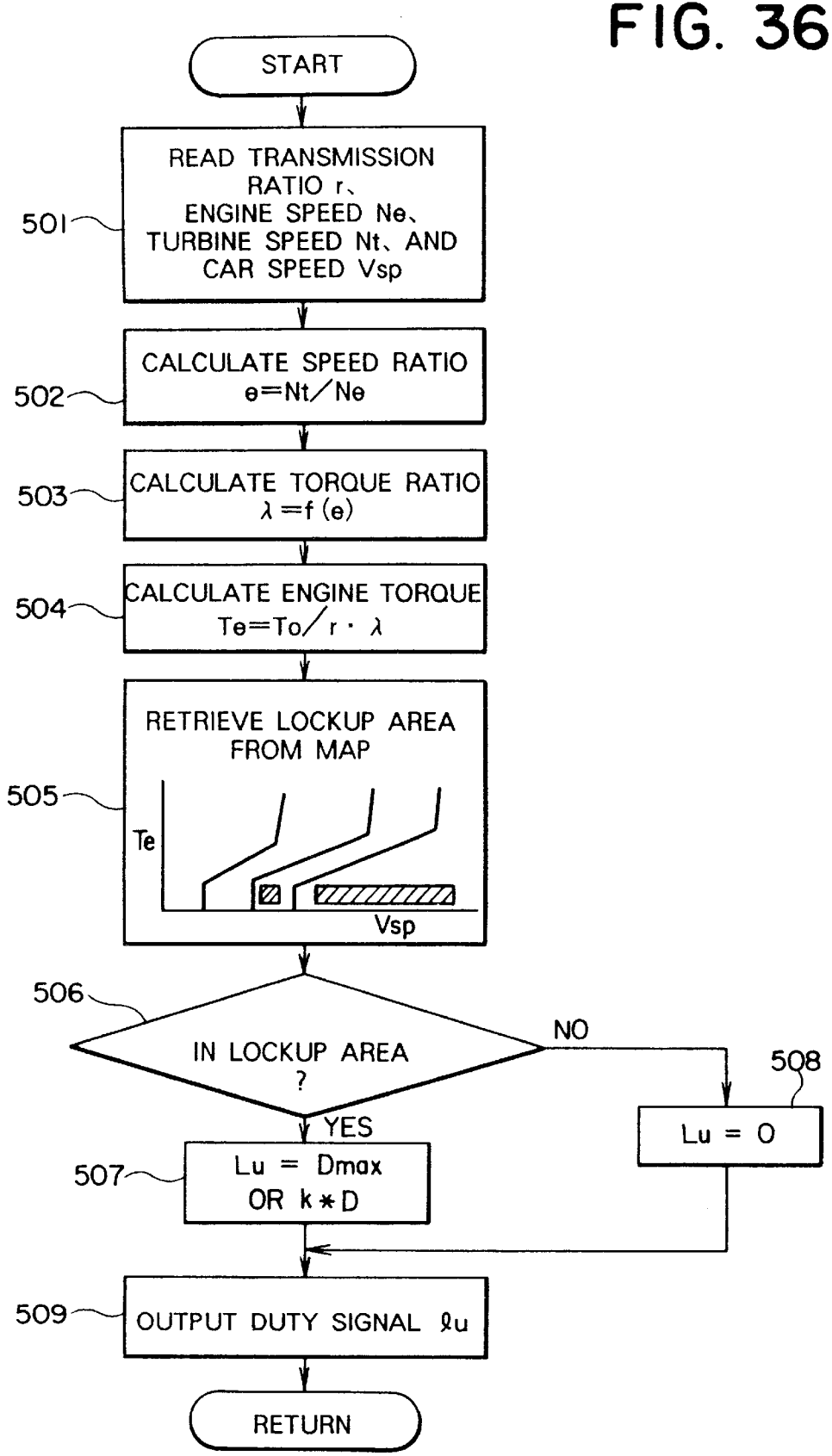
FIG. 36 is a flowchart for showing another embodiment of the control of the engaging and disengaging of the lockup clutch.

FIG. 36 shows a flowchart of the system for engaging the lockup clutch if the car driving area is within a specific area. At step 501, a current speed change ratio r, an output signal To of the torque sensor 12, an engine speed signal Ne, a turbine speed Nt of the torque converter and a car speed VSP are read. At step 502, a speed ratio e=Nt/Ne is calculated. At step 503, a torque ratio λ is calculated from a predetermined function λ=f(e). At step 504, an engine torque Te is obtained from Te=To/r·λ. At step 505, a shift program map using, as parameters, the engine torque Te and the car speed Vsp, stored in the memory in advance, is referred to and the engine torque of the lockup clutch engaging area and the car speed conditions are read. At step 506, a decision is made whether the map of the current engine torque Te and the car speed Vsp is in the lockup clutch engaging area or not. If the map is in the lockup clutch engaging area, a duty ratio lu for controlling the engaging of the lockup clutch is decided at step 507. When the map is in the lockup clutch area, in order to drive the car by the torque converter, a duty ratio lu=0 is outputted at step 508. At step 408, the lockup actuator 21 is controlled based on the given duty ratio.

Figure 37:
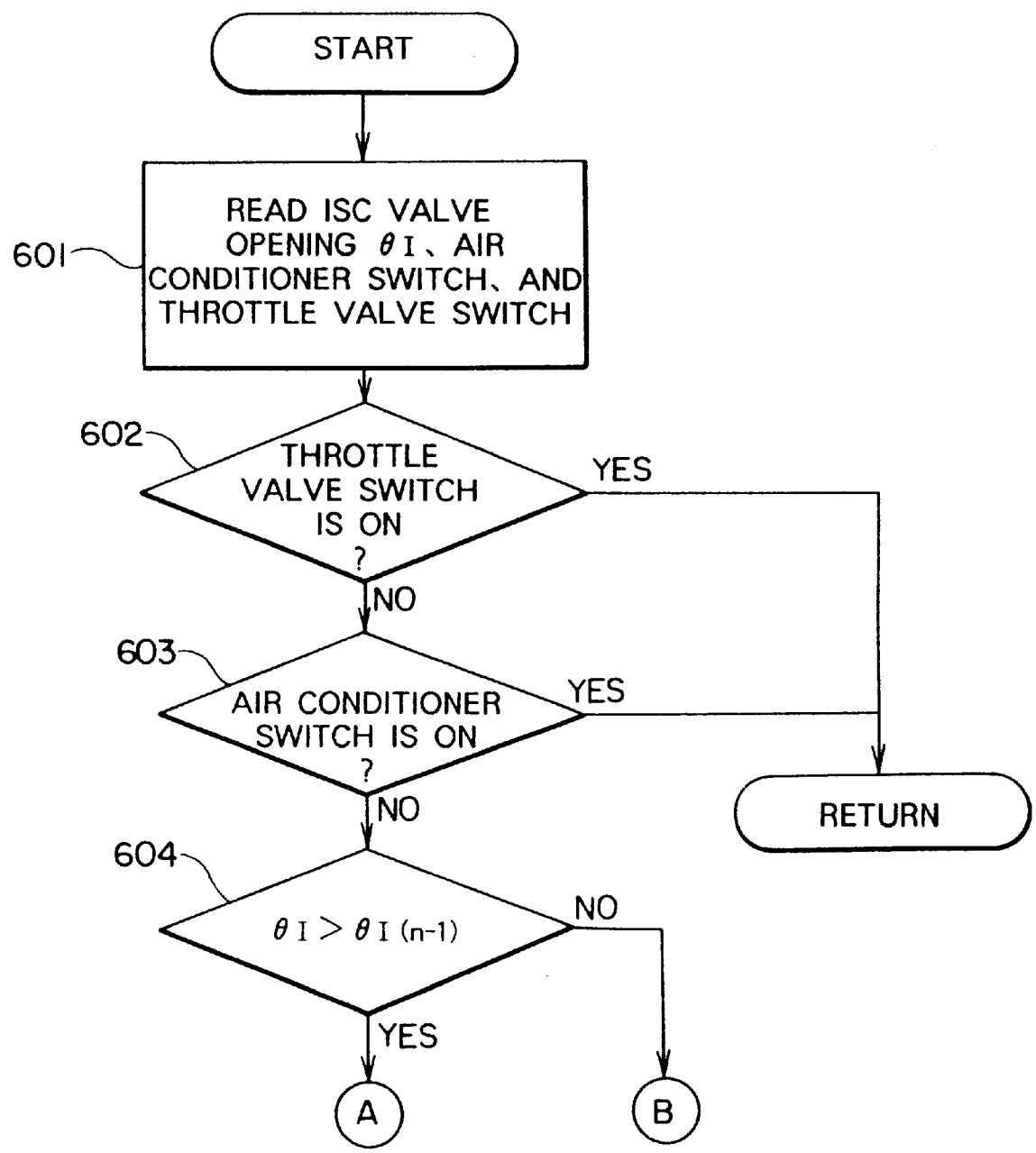
FIG. 37 is a flowchart for showing still another embodiment of the control of the engaging and disengaging of the lockup clutch.

Next, the method for controlling the lockup clutch in the engine which uses an Idle Speed Control (ISC) valve will be explained with reference to FIG. 37. As shown in FIG. 3, the ISC valve 26 is disposed in parallel with the throttle valve in the air intake system. The ISC valve 26 is used to control an increase or decrease of the intake air quantity based on an electrical signal separate from the throttle valve. For example, there is a case where the idling speed is reduced due to driving of a large load unit, such as an air-conditioner compressor, working during an idling operation of the engine. In such a case, the ISC valve 26 increases an intake air quantity to compensate for a drop of the idling speed. The use of this function of the ISC valve makes it possible to control the air-fuel ratio. In other words, by controlling the ISC valve opening level or the valve opening rate, it becomes possible to accurately control the air-fuel ratio of the mixture in the lean area. When the ISC valve is controlling the air-fuel ratio of the lean area, the control of the lockup clutch as shown in FIG. 35 is carried out.

At step 601, a valve opening angle θx of the valve 26, a state of a switch of the air conditioner (not shown) and a state of the throttle valve switch (not shown) are read. The throttle valve switch is the switch for showing whether the throttle valve is open or closed (or in the idle state), and a valve opening signal of the throttle valve actuator 29 can also be utilized. At step 602, a decision is made whether the throttle valve switch is ON or OFF (or in the idle state). If the throttle valve switch is not in the idle state, a decision is made at step 603 whether the switch of the air conditioner is ON or OFF. If the air conditioner is not operating, at step 604, a decision is made whether the current valve opening angle θx of the ISC valve 26 is larger than the previous valve opening angle θx(n−1) (where n is an integer). If the current valve opening angle is larger, a lean burn control is to be carried out and the processing at the step 407 afterward of the flow in FIG. 35 are carried out. If the current valve opening state is the same as the previous valve opening angle or smaller than this, the processing's at the step 408 and afterward of the flow in FIG. 35 are carried out.

FIG. 38 shows an engine efficiency diagram wherein the real lines represent the specific fuel consumption curves (g/ps·h), and the dotted lines represent the equi-horsepower curves (ps). This diagram can be utilized in the method and apparatus of the present invention. There may be infinite number of the equi-horsepower curves in the diagram. When the least fuel consumption points (dots) are traced on the infinite equi-horsepower curves, the optimum fuel consumption operation curve (g/h(min)) as indicated by the chain line is obtained. When the engine is operated with tracing on the optimum fuel consumption operation curve, the engine is operated in the ideal optimum efficiency. The fuel economy can be improved when the engine is operated in the optimum fuel consumption by controlling the air flow and the transmission ratio.

It should be noted that the present invention is not limited to the above-described embodiments, and all the aspects that any person in this technical field can apply, alter or improve based on the above-described specification, drawings and disclosure of the claims, shall all be included under the scope of the present invention.

According to the present invention, there is an effect that a lockup is possible from the time of starting the car and thus the fuel economy is improved.

Further, according to the present invention, drivability can be secured when a torque variation is large, and a driving force requested by the driver can be obtained, with a high fuel economy.

What is claimed is:

1. An apparatus for controlling an engine capable of lean mixture operation, comprising:

an engine speed detecting unit for detecting an engine speed of said engine;

an engine torque determining unit for determining a target engine torque corresponding to an acceleration requirement; and a storage unit for storing data map indicating values of target throttle opening of said engine with respect to parameters of said engine speed and said target engine torque, a plurality of sets of said values of target throttle opening being stored in said storage unit, and said sets being provided for different air-fuel ratio values of the mixture.

2. An apparatus according to claim 1, wherein said acceleration requirement is a target driving torque which is determined from a depression stroke of an accelerator pedal.

3. A method of controlling an engine capable of operating in lean mixture, comprising a step of determining a target throttle opening value as parameters of a detected engine speed, a target engine torque corresponding to an acceleration requirement and a plurality of target air-fuel ratio values.

4. An method according to claim 3, wherein said acceleration requirement is a target driving torque which is determined from a depression stroke of an accelerator pedal.

5. An apparatus according to claim 1, further comprising a control unit for (a) selecting a data map on the basis of a given air-fuel ratio, (b) looking up the selected data map, and (c) determining the target throttle opening according to the selected data map.

* * * * *